(12) United States Patent
Pahl et al.

(10) Patent No.: US 11,991,157 B2
(45) Date of Patent: *May 21, 2024

(54) SECURE SESSION CAPABILITY USING PUBLIC-KEY CRYPTOGRAPHY WITHOUT ACCESS TO THE PRIVATE KEY

(71) Applicant: Cloudflare, Inc., San Francisco, CA (US)

(72) Inventors: Sébastien Andreas Henry Pahl, San Francisco, CA (US); Matthieu Philippe François Tourne, San Francisco, CA (US); Piotr Sikora, San Francisco, CA (US); Ray Raymond Bejjani, San Francisco, CA (US); Dane Orion Knecht, San Francisco, CA (US); Matthew Browning Prince, San Francisco, CA (US); John Graham-Cumming, London (GB); Lee Hahn Holloway, Santa Cruz, CA (US); Albertus Strasheim, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,750

(22) Filed: Jan. 3, 2023

(65) Prior Publication Data

US 2023/0224290 A1  Jul. 13, 2023

Related U.S. Application Data

(60) Continuation of application No. 17/036,988, filed on Sep. 29, 2020, now Pat. No. 11,546,309, which is a
(Continued)

(51) Int. Cl.
*H04L 9/40* (2022.01)
*G06F 21/33* (2013.01)
(Continued)

(52) U.S. Cl.
CPC ........ *H04L 63/0435* (2013.01); *G06F 21/335* (2013.01); *H04L 9/0825* (2013.01);
(Continued)

(58) Field of Classification Search
CPC . H04L 63/0823; H04L 9/0825; H04L 9/0841; H04L 9/0869; H04L 9/3263;
(Continued)

(56) References Cited

U.S. PATENT DOCUMENTS 5,657,390 A   8/1997   Elgamal et al.
6,128,279 A   10/2000  O'Neil et al.
(Continued)

FOREIGN PATENT DOCUMENTS

EP   1533970 A1    5/2005
EP   1777907 B1 *  12/2007   ......... H04L 63/0428
(Continued)

OTHER PUBLICATIONS

Advisory Action, U.S. Appl. No. 13/193,574, dated Jun. 5, 2014, 13 pages.
(Continued)

*Primary Examiner* — Saleh Najjar
*Assistant Examiner* — Peiliang Pan
(74) *Attorney, Agent, or Firm* — NICHOLSON DE VOS WEBSTER & ELLIOTT LLP

(57) ABSTRACT

A server establishes a secure session with a client device where a private key used in the handshake is stored in a different server. An encrypted connection is established between the first server and the second server. A message is received from the client device that initiates a procedure to
(Continued)

establish the secure session between the client device and the first server. As part of this procedure, the first server transmits over the encrypted connection a request to the second server to use the private key. The first server receives, over the encrypted connection, a response to the request that includes a result of the use of the private key. The first server uses the result during the procedure to establish the secure session.

15 Claims, 10 Drawing Sheets

Related U.S. Application Data continuation of application No. 16/159,437, filed on Oct. 12, 2018, now Pat. No. 10,791,099, which is a division of application No. 15/413,187, filed on Jan. 23, 2017, now Pat. No. 10,129,224, which is a continuation of application No. 14/315,241, filed on Jun. 25, 2014, now Pat. No. 9,553,856, which is a continuation of application No. 13/788,784, filed on Mar. 7, 2013, now Pat. No. 8,782,774.

(51) Int. Cl.
*H04L 9/08* (2006.01)
*H04L 9/32* (2006.01)

(52) U.S. Cl.
CPC .......... *H04L 9/0841* (2013.01); *H04L 9/0869* (2013.01); *H04L 9/3263* (2013.01); *H04L 63/0442* (2013.01); *H04L 63/061* (2013.01); *H04L 63/0823* (2013.01); *H04L 63/0869* (2013.01); *H04L 63/166* (2013.01)

(58) Field of Classification Search
CPC ............. H04L 63/0435; H04L 63/0442; H04L 63/061; H04L 63/166; H04L 2209/76; H04L 63/0471
USPC .......................................................... 726/15
See application file for complete search history.

(56) References Cited

U.S. PATENT DOCUMENTS

| | | | |
|---|---|---|---|
| 6,442,687 B1 | 8/2002 | Savage | |
| 6,643,701 B1* | 11/2003 | Aziz | H04L 67/14 709/227 |
| 6,785,542 B1 | 8/2004 | Blight et al. | |
| 6,823,454 B1 | 11/2004 | Hind et al. | |
| 6,976,176 B1 | 12/2005 | Schier | |
| 7,096,352 B2 | 8/2006 | Kang et al. | |
| 7,137,143 B2 | 11/2006 | Chawla et al. | |
| 7,249,377 B1 | 7/2007 | Lita et al. | |
| 7,320,073 B2* | 1/2008 | Zissimopoulos | H04L 9/3242 713/160 |
| 7,454,457 B1 | 11/2008 | Lowery et al. | |
| 7,543,146 B1 | 6/2009 | Karandikar et al. | |
| 7,650,359 B2 | 1/2010 | Sato et al. | |
| 7,673,331 B2 | 3/2010 | Kido et al. | |
| 7,869,591 B1 | 1/2011 | Nagel et al. | |
| 7,886,153 B2* | 2/2011 | Miyazawa | H04L 63/0428 380/282 |
| 7,917,758 B2 | 3/2011 | Palekar et al. | |
| 7,921,292 B1 | 4/2011 | Pauker et al. | |
| 8,275,790 B2 | 9/2012 | Fredricksen et al. | |
| 8,327,128 B1 | 12/2012 | Prince et al. | |
| 8,332,625 B2 | 12/2012 | Fritzges et al. | |
| 8,527,757 B2* | 9/2013 | Lu | H04L 63/18 713/168 |
| 8,543,805 B2* | 9/2013 | Ovsiannikov | H04L 63/0281 713/168 |
| 8,615,795 B2 | 12/2013 | Cottrell et al. | |
| 8,700,892 B2 | 4/2014 | Bollay et al. | |
| 8,732,461 B2 | 5/2014 | Fujii et al. | |
| 8,738,902 B2 | 5/2014 | Yoo et al. | |
| 8,782,774 B1 | 7/2014 | Pahl et al. | |
| 8,966,267 B1 | 2/2015 | Pahl et al. | |
| 8,996,873 B1 | 3/2015 | Pahl et al. | |
| 9,015,469 B2 | 4/2015 | Prince et al. | |
| 9,049,247 B2 | 6/2015 | Holloway et al. | |
| 9,184,911 B2 | 11/2015 | Pahl et al. | |
| 9,385,864 B2 | 7/2016 | Pahl et al. | |
| 9,450,950 B2 | 9/2016 | Pahl et al. | |
| 9,553,856 B2 | 1/2017 | Pahl et al. | |
| 9,628,509 B2 | 4/2017 | Holloway et al. | |
| 9,680,807 B2 | 6/2017 | Pahl et al. | |
| 10,009,183 B2 | 6/2018 | Pahl et al. | |
| 10,033,529 B2 | 7/2018 | Pahl et al. | |
| 10,129,224 B2 | 11/2018 | Pahl et al. | |
| 10,594,496 B2 | 3/2020 | Pahl et al. | |
| 2002/0016911 A1 | 2/2002 | Chawla et al. | |
| 2003/0028495 A1* | 2/2003 | Pallante | G06Q 20/341 705/78 |
| 2004/0015725 A1 | 1/2004 | Boneh et al. | |
| 2004/0054712 A1 | 3/2004 | Andreev et al. | |
| 2004/0111600 A1 | 6/2004 | Kaler et al. | |
| 2004/0133688 A1 | 7/2004 | Takamatsu | |
| 2004/0161110 A1 | 8/2004 | Kanai et al. | |
| 2004/0210756 A1 | 10/2004 | Mowers et al. | |
| 2004/0268142 A1 | 12/2004 | Karjala et al. | |
| 2005/0097362 A1* | 5/2005 | Winget | H04L 63/0823 726/4 |
| 2005/0188220 A1 | 8/2005 | Nilsson et al. | |
| 2005/0216736 A1 | 9/2005 | Smith | |
| 2005/0257045 A1* | 11/2005 | Bushman | H04L 63/12 713/156 |
| 2005/0259645 A1 | 11/2005 | Chen et al. | |
| 2005/0262357 A1 | 11/2005 | Araujo et al. | |
| 2005/0273849 A1 | 12/2005 | Araujo et al. | |
| 2005/0283443 A1 | 12/2005 | Hardt | |
| 2005/0283614 A1 | 12/2005 | Hardt | |
| 2005/0289084 A1 | 12/2005 | Thayer et al. | |
| 2006/0005017 A1 | 1/2006 | Black et al. | |
| 2006/0005237 A1 | 1/2006 | Kobata et al. | |
| 2006/0005239 A1 | 1/2006 | Mondri et al. | |
| 2006/0155855 A1* | 7/2006 | Hamai | H04L 63/0823 709/227 |
| 2006/0161644 A1 | 7/2006 | Adelman et al. | |
| 2006/0212697 A1 | 9/2006 | Sato et al. | |
| 2006/0294366 A1* | 12/2006 | Nadalin | H04L 9/3271 713/156 |
| 2007/0060097 A1 | 3/2007 | Edge et al. | |
| 2007/0074282 A1* | 3/2007 | Black | H04L 63/166 726/14 |
| 2007/0150418 A1 | 6/2007 | Ben-Menahem et al. | |
| 2007/0157027 A1 | 7/2007 | Palekar et al. | |
| 2007/0189279 A1 | 8/2007 | Thalanany et al. | |
| 2008/0022043 A1 | 1/2008 | Adams et al. | |
| 2008/0134311 A1 | 6/2008 | Medvinsky et al. | |
| 2008/0189773 A1 | 8/2008 | Maiorano et al. | |
| 2008/0263215 A1 | 10/2008 | Schnellbaecher | |
| 2008/0306875 A1 | 12/2008 | Mardikar | |
| 2009/0055284 A1 | 2/2009 | Takayama | |
| 2009/0092247 A1 | 4/2009 | Kido et al. | |
| 2009/0132806 A1 | 5/2009 | Blommaert et al. | |
| 2009/0158040 A1 | 6/2009 | Chaudhary et al. | |
| 2009/0232315 A1 | 9/2009 | Bandaram et al. | |
| 2009/0307759 A1 | 12/2009 | Schnell et al. | |
| 2009/0327116 A1 | 12/2009 | Cunningham et al. | |
| 2009/0327696 A1 | 12/2009 | Hatlelid et al. | |
| 2010/0017848 A1 | 1/2010 | Pomerantz | |
| 2010/0111300 A1 | 5/2010 | Kido et al. | |
| 2010/0223456 A1 | 9/2010 | Schneider | |
| 2010/0274836 A1 | 10/2010 | Orentas et al. | |
| 2011/0154019 A1 | 6/2011 | Wang | |
| 2011/0179286 A1 | 7/2011 | Spalka et al. | |
| 2011/0264905 A1 | 10/2011 | Ovsiannikov | |
| 2012/0131329 A1 | 5/2012 | Liang et al. | |
| 2012/0174196 A1 | 7/2012 | Bhogavilli et al. | |
| 2012/0209942 A1 | 8/2012 | Zehavi et al. | |

(56) References Cited

U.S. PATENT DOCUMENTS

| | | | |
|---|---|---|---|
| 2012/0254622 A1* | 10/2012 | Kanungo | ............... G06F 21/34 |
| | | | 713/183 |
| 2012/0311322 A1 | 12/2012 | Koyun et al. | |
| 2013/0031356 A1 | 1/2013 | Prince et al. | |
| 2013/0097687 A1 | 4/2013 | Storm | |
| 2013/0124866 A1 | 5/2013 | Farrugia et al. | |
| 2013/0156189 A1* | 6/2013 | Gero | ................... H04L 9/0825 |
| | | | 380/255 |
| 2013/0219166 A1* | 8/2013 | Ristov | ............... H04L 63/0853 |
| | | | 713/176 |
| 2013/0305036 A1 | 11/2013 | Vos | |
| 2014/0044265 A1 | 2/2014 | Kocher et al. | |
| 2014/0098960 A1 | 4/2014 | Xu et al. | |
| 2014/0259147 A1 | 9/2014 | Alleman et al. | |
| 2015/0039890 A1 | 2/2015 | Khosravi et al. | |
| 2015/0067338 A1 | 3/2015 | Gero et al. | |
| 2016/0065374 A1 | 3/2016 | Sauerwald et al. | |
| 2016/0080337 A1 | 3/2016 | Pahl et al. | |
| 2016/0261411 A1 | 9/2016 | Yau et al. | |
| 2019/0044924 A1 | 2/2019 | Pahl et al. | |
| 2019/0260723 A1 | 8/2019 | Manges | |
| 2020/0162269 A1 | 5/2020 | Nix | |

FOREIGN PATENT DOCUMENTS

| | | | |
|---|---|---|---|
| WO | 2004/036360 A2 | 4/2004 | |
| WO | WO-2004091166 A1 * | 10/2004 | ......... H04L 63/0823 |
| WO | WO-2006006324 A1 * | 1/2006 | ............. H04L 67/14 |
| WO | 2013/090894 A1 | 6/2013 | |

OTHER PUBLICATIONS

Advisory Action, U.S. Appl. No. 14/692,397, dated May 1, 2018, 3 pages.

Blake-Wilson et al., "Elliptic Curve Cryptography (ECC) Cipher Suites for Transport Layer Security (TLS)", Network Working Group, Request for Comments: 4492, May 2006, 35 pages.

Blake-Wilson et al., Request for Comments: 3546, Network Working Group, Transport Layer Security (TLS) Extensions, Jun. 2003, 30 pages.

Blake-Wilson et al., Request for Comments: 4366, Network Working Group, Transport Layer Security (TLS) Extensions, Apr. 2006, 31 pages.

Chen et al., "Pretty-Bad-Proxy: An Overlooked Adversary in Browsers' HTTPS Deployments," 2009, IEEE—Computer Society, pp. 347-359.

Communication pursuant to Article 94(3) EPC, EP App. No. 14759676.1, dated Jun. 8, 2020, 5 pages.

Cooley et al., "Secure Channel Establishment in Disadvantaged Networks," 2010, IEEE, pp. 32-38.

Corrected Notice of Allowance, U.S. Appl. No. 13/788,784, dated May 21, 2014, 13 pages.

Decision to grant a European patent, EP App. No. 14759676.1, dated Sep. 1, 2022, 2 pages.

Dierks et al., "The Transport Layer Security (TLS) Protocol, Version 1.1", Network Working Group, Request for Comments: 4346, Apr. 2006, 87 pages.

Dierks et al., "The Transport Layer Security (TLS) Protocol, Version 1.2", Network Working Group, Request for Comments: 5246, Aug. 2008, 104 pages.

Donenfeld, Jason A., "WireGuard: Next Generation Kernel Network Tunnel", Available Online <https://www.wireguard.com/papers/wireguard.pdf>, Jun. 30, 2018, pp. 1-20.

E. Rescorla, Request for Comments: 2818, Network Working Group, HTTP Over TLS, May 2000, 8 pages.

Edstrom B., et al., "blog.bjm.se: Fun with the TLS handshake, Programming and stuff," Jul. 28, 2012, 11 pages.

EL Sawda et al., "SIP Security Attacks and Solutions: A State-of-the-art Review," 2006, IEEE, pp. 3187-3191.

European Search Report and Search Opinion, EP App. No. 14759676.1, dated Jan. 13, 2017, 7 pages.

Final Office Action, U.S. Appl. No. 13/193,574, dated Mar. 27, 2014, 12 pages.

Final Office Action, U.S. Appl. No. 14/248,254, dated Dec. 10, 2014, 12 pages.

Final Office Action, U.S. Appl. No. 14/692,397, dated Dec. 2, 2016, 15 pages.

Final Office Action, U.S. Appl. No. 14/692,397, dated Dec. 5, 2017, 18 pages.

Final Office Action, U.S. Appl. No. 14/692,397, dated May 20, 2016, 18 pages.

Final Office Action, U.S. Appl. No. 16/043,972, dated Feb. 10, 2020, 12 pages.

Final Office Action, U.S. Appl. No. 16/043,972, dated Sep. 24, 2020, 9 pages.

Freier et al., "The Secure Sockets Layer (SSL) Protocol Version 3.0", Internet Engineering Task Force (IETF), Request for Comments: 6101, Aug. 2011, 67 pages.

Henk et al., "Controlled Disclosure of Context Information Across Ubiquitous Computing Domains," 2008, IEEE, pp. 98-105.

Intention to grant, EP App. No. 14759676.1, dated Mar. 31, 2022, 8 pages.

International Preliminary Report on Patentability, PCT App. No. PCT/US2014/021434, dated Sep. 17, 2015, 8 pages.

International Search Report and Written Opinion, PCT App. No. PCT/US2014/021434, dated Apr. 14, 2014, 10 pages.

Jager et al., "On the Security of TLS-DHE in the Standard Model," CRYPTO 2012, LNCS 7417, International Association for Cryptologic Research, 2012, pp. 273-293.

Non-Final Office Action from U.S. Appl. No. 15/413,187, dated Aug. 4, 2017, 12 pages.

Non-Final office action from U.S. Appl. No. 16/043,972, dated Aug. 28, 2019, 21 pages.

Non-Final Office Action, U.S. Appl. No. 13/193,574, dated Jul. 17, 2014, 11 pages.

Non-Final Office Action, U.S. Appl. No. 13/193,574, dated Nov. 25, 2013, 15 pages.

Non-Final Office Action, U.S. Appl. No. 13/251,023, dated Feb. 10, 2012, 15 pages.

Non-Final Office Action, U.S. Appl. No. 13/788,784, dated Jul. 11, 2013, 13 pages.

Non-Final Office Action, U.S. Appl. No. 13/788,784, dated Nov. 25, 2013, 12 pages.

Non-Final Office Action, U.S. Appl. No. 14/248,254, dated Jul. 8, 2014, 11 pages.

Non-Final Office Action, U.S. Appl. No. 14/315,241, dated Jul. 28, 2015, 16 pages.

Non-Final Office Action, U.S. Appl. No. 14/630,585, dated Sep. 30, 2015, 8 pages.

Non-Final Office Action, U.S. Appl. No. 14/692,397, dated May 18, 2018, 19 pages.

Non-Final Office Action, U.S. Appl. No. 14/692,397, dated May 19, 2017, 15 pages.

Non-Final Office Action, U.S. Appl. No. 14/692,397, dated Sep. 15, 2015, 19 pages.

Non-Final Office Action, U.S. Appl. No. 14/937,805, dated May 6, 2016, 36 pages.

Non-Final Office Action, U.S. Appl. No. 15/202,371, dated Sep. 13, 2017, 12 pages.

Non-Final Office Action, U.S. Appl. No. 15/202,371, dated Sep. 21, 2016, 17 pages.

Non-Final Office Action, U.S. Appl. No. 16/043,972, dated May 20, 2020, 9 pages.

Non-Final Office Action, U.S. Appl. No. 16/188,244, dated Dec. 19, 2019, 27 pages.

Non-Final Office Action, U.S. Appl. No. 16/816,194, dated Jun. 9, 2020, 9 pages.

Non-Final Office Action, U.S. Appl. No. 17/036,988, dated Mar. 10, 2022, 5 pages.

Notice of Allowability, U.S. Appl. No. 16/159,437, dated Jun. 2, 2020, 8 pages.

(56) References Cited

OTHER PUBLICATIONS

Notice of Allowance from U.S. Appl. No. 15/413,187, dated Jul. 16, 2018, 24 pages.
Notice of Allowance, U.S. Appl. No. 16/159,437, dated Dec. 31, 2019, 10 pages.
Notice of Allowance, U.S. Appl. No. 13/193,574, dated Dec. 22, 2014, 7 pages.
Notice of Allowance, U.S. Appl. No. 13/251,023, dated Aug. 2, 2012, 18 pages.
Notice of Allowance, U.S. Appl. No. 13/788,784, dated Feb. 18, 2014, 11 pages.
Notice of Allowance, U.S. Appl. No. 14/248,253, dated Jul. 14, 2014, 22 pages.
Notice of Allowance, U.S. Appl. No. 14/248,253, dated Oct. 30, 2014, 8 pages.
Notice of Allowance, U.S. Appl. No. 14/248,254, dated Jul. 6, 2015, 9 pages.
Notice of Allowance, U.S. Appl. No. 14/248,256, dated Jun. 23, 2014, 11 pages.
Notice of Allowance, U.S. Appl. No. 14/248,256, dated Oct. 8, 2014, 11 pages.
Notice of Allowance, U.S. Appl. No. 14/315,241, dated Jan. 22, 2016, 20 pages.
Notice of Allowance, U.S. Appl. No. 14/315,241, dated Sep. 23, 2016, 16 pages.
Notice of Allowance, U.S. Appl. No. 14/630,585, dated Mar. 2, 2016, 12 pages.
Notice of Allowance, U.S. Appl. No. 14/692,397, dated Jul. 6, 2018, 13 pages.
Notice of Allowance, U.S. Appl. No. 14/692,397, dated Nov. 14, 2018, 13 pages.
Notice of Allowance, U.S. Appl. No. 14/937,805, dated Aug. 24, 2016, 7 pages.
Notice of Allowance, U.S. Appl. No. 14/937,805, dated Feb. 15, 2017, 12 pages.
Notice of Allowance, U.S. Appl. No. 15/202,371, dated Apr. 11, 2017, 16 pages.
Notice of Allowance, U.S. Appl. No. 15/202,371, dated Mar. 27, 2018, 14 pages.
Notice of Allowance, U.S. Appl. No. 15/271,190, dated Feb. 27, 2018, 14 pages.
Notice of Allowance, U.S. Appl. No. 15/271,190, dated Oct. 23, 2017, 15 pages.
Notice of Allowance, U.S. Appl. No. 16/019,109, dated Nov. 12, 2019, 19 pages.
Notice of Allowance, U.S. Appl. No. 16/043,972, dated Feb. 24, 2021, 18 pages.
Notice of Allowance, U.S. Appl. No. 16/188,244, dated May 20, 2020, 9 pages.
Notice of Allowance, U.S. Appl. No. 16/356,304, dated Jan. 15, 2021, 2 pages.
Notice of Allowance, U.S. Appl. No. 16/356,304, dated Nov. 30, 2020, 9 pages.
Notice of Allowance, U.S. Appl. No. 16/816,194, dated Sep. 22, 2020, 8 pages.
Notice of Allowance, U.S. Appl. No. 16/820,489, dated Apr. 29, 2022, 13 pages.
Notice of Allowance, U.S. Appl. No. 17/036,988, dated Sep. 14, 2022, 10 pages.
Notice of Allowance, U.S. Appl. No. 17/158,787, dated Jan. 25, 2023, 10 pages.
Notice of Allowance, U.S. Appl. No. 17/181,917, dated Oct. 31, 2022, 8 pages.
Office Action received for European Application No. 14759676.1, dated Aug. 21, 2019, 6 pages.
Office Action, EP App. No. 14759676.1, dated Apr. 28, 2021, 5 pages.
Office Action, EP App. No. 14759676.1, dated Sep. 12, 2018, 5 pages.
Requirement for Restriction/Election from U.S. Appl. No. 15/413,187, dated Jan. 26, 2018, 9 pages.
Salowey et al., "Transport Layer Security (TLS) Session Resumption without Server-Side State", Network Working Group, Request for Comments: 5077, Jan. 2008, 20 pages.
Supplemental Notice of Allowance, U.S. Appl. No. 14/248,253, dated Feb. 18, 2015, 6 pages.
T. Dierks et al., Request for Comments: 2246, Network Working Group, The TLS Protocol Version 1.0, Jan. 1999, 81 pages.
Wireguard, "Protocol & Cryptography", Available Online at <https://www.wireguard.com/protocol/>, Retrieved on Mar. 11, 2020, pp. 1-8.
Wu, Peter, "Analysis of the WireGuard protocol", Master's Thesis, Analysis of the WireGuard protocol, Eindhoven University of Technology, Jun. 17, 2019, 89 pages.

\* cited by examiner

SECURE SESSION CAPABILITY USING PUBLIC-KEY CRYPTOGRAPHY WITHOUT ACCESS TO THE PRIVATE KEY

CROSS-REFERENCE TO RELATED APPLICATIONS

This is application is a continuation of Ser. No. 17/036,988, filed Sep. 29, 2020, which is a continuation of application Ser. No. 16/159,437, filed Oct. 12, 2018, now U.S. Pat. No. 10,791,099, which is a divisional of application Ser. No. 15/413,187 filed Jan. 23, 2017, now U.S. Pat. No. 10,129,224, which is a continuation of application Ser. No. 14/315,241, filed Jun. 25, 2014, now U.S. Pat. No. 9,553,856, which is a continuation of application Ser. No. 13/788,784, filed Mar. 7, 2013, now U.S. Pat. No. 8,782,774, which is hereby incorporated by reference.

FIELD

Embodiments of the invention relate to the field of secure network communications; and more specifically, to establishing a secure session (e.g., Secure Sockets Layer (SSL), Transport Layer Security (TLS)) using public-key cryptography where the server does not have access to the private key used during the secure session handshake.

BACKGROUND

Secure Sockets Layer (SSL) and Transport Layer Security (TLS), which is the successor to SSL, provide secure network connections. SSL and/or TLS are commonly used during web browsing (e.g., using HTTPS), email, and other Internet applications. SSL and TLS are described in several Request For Comments (RFCs), including RFC 2246 (describing TLS 1.0), RFC 4346 (describing TLS 1.1), RFC 5246 (describing TLS 1.2), and RFC 6101 (describing SSL 3.0).

An SSL or TLS client and server negotiate a set of parameters to establish a secure session in a process called a handshake. For example, the client transmits a hello message (referred to as a ClientHello message) that includes the following: an indication of the requested version of the SSL or TLS protocol, a requested session identifier used to identify the session connection, a list of the cipher suites (cryptographic options) supported by the client, a list of the compression methods supported by the client, random data used for cryptographic purposes (sometimes referred to as ClientHello.random), and may indicate whether and what type of extensions (defined by the protocol) the client supports.

In response, the server transmits a hello message to the client (referred to as a ServerHello message) that includes the version of the SSL or TLS protocol supported by the server, a session identifier that will be used to identify the session, the selected cipher suite (selected from the list of cipher suites included in the ClientHello message), the selected compression method (selected from the list of compression methods included in the ClientHello message), random data used for cryptographic purposes that is different than the random data included in the ClientHello message (sometimes referred to as ServerHello.random), and may include a list of the extensions that the server supports.

Following the hello messages, the server transmits a list of its certificate(s) in a message referred to as a Certificate message (sometimes referred to as a Server Certificate message). The server then transmits a message indicating that the hello-message phase of the handshake is complete (referred to as a ServerHelloDone message). For some implementations, depending on which key exchange methods are used (e.g., implementations using Diffie-Hellman cipher suites), the server also transmits a message to the client (referred to as a ServerKeyExchange message) that conveys cryptographic information to allow the client to calculate the premaster secret. This message is signed using the private key of the server. The client then transmits a message to the server (referred to as a ClientKeyExchange message) that includes a random value typically generated by the client called a premaster secret or Diffie-Hellman parameters that allows the client and server to agree upon the same premaster secret. The premaster secret is used by both the client and the server to generate a shared secret (referred to as the master secret) that is used to generate session keys that are used to encrypt and decrypt information during the secure session. If the premaster secret is included in the ClientKeyExchange message, it is encrypted using the public key in the certificate sent by the server. By way of a specific example, if the Rivest-Shamir-Adelman (RSA) algorithm is being used for key agreement and authentication, the client generates a 48-byte value for the premaster secret and encrypts it using the public key from the server's certificate and transmits the encrypted premaster secret to the server. By way of another specific example, if a Diffie-Hellman implementation is used, the ClientKeyExchange message includes the client's Diffie-Hellman public value. By way of another specific example, if a FORTEZZA hardware encryption system is being used, the client derives a token encryption key (TEK) using the FORTEZZA Key Exchange Algorithm (KEA), which itself uses the public key from the server's certificate along with private parameters of the client, generates a random 48-byte value for the premaster secret and encrypts it using the TEK and transmits the encrypted premaster secret to the server.

If the server receives the encrypted premaster secret in the ClientKeyExchange message, it decrypts it with their private key. In an implementation where the ClientKeyExchange message includes cryptographic parameters to generate the premaster secret, the server generates the premaster secret using those cryptographic parameters (which also requires the use of the private key).

The client and server each perform a series of steps to generate a master secret from the premaster secret, using the random data included in the ClientHello and ServerHello messages (e.g., the ClientHello.random and ServerHello.random). The master secret is a shared secret that is used to generate session keys, which are symmetric keys that are used to encrypt and decrypt information during the secure session.

The client then transmits a message to the server informing it that future messages will be encrypted (referred to as a ChangeCipherSpec message). The client then transmits an encrypted message to the server for validation (referred to as a Finished message). The server transmits to the client a message that future messages will be encrypted (a ChangeCipherSpec message) and an encrypted message to the client for validation (a Finished message). From then on, the handshake is complete and the secure session is established such that future messages between the client and server are encrypted.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
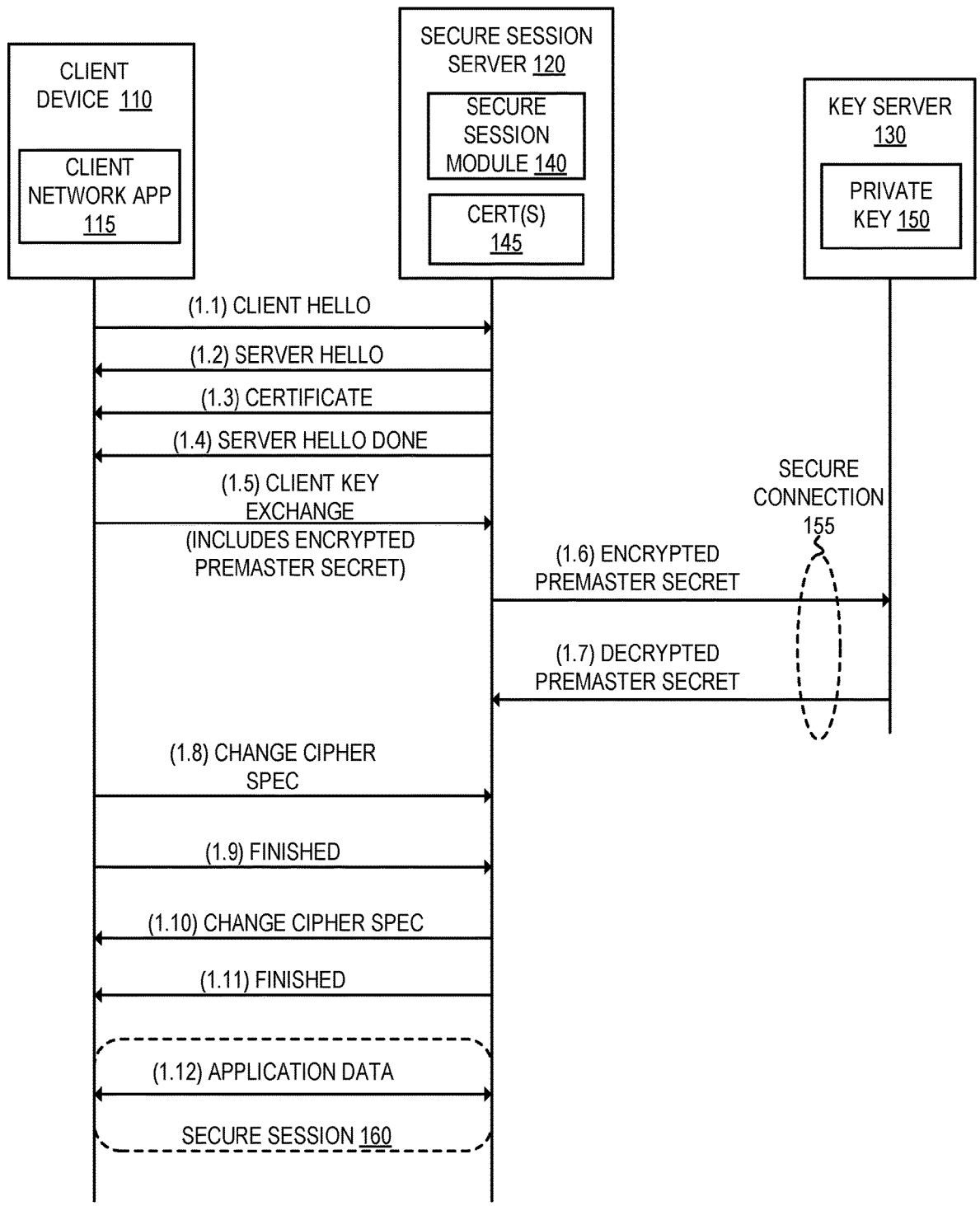
FIG. 1 illustrates exemplary messages for establishing a secure session using public-key cryptography between a client device and a secure session server where the secure session server does not have access to the private key used during the secure session handshake according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for establishing a secure session (e.g., SSL or TLS) using public-key cryptography where the secure session server does not have access to the private key used during the secure session handshake is described. The secure session server is a computing device that transmits and receives Internet traffic to and from client devices and is the server in the secure session. By way of a specific example that is used throughout this specification, the secure session server may receive and transmit traffic for the domain https://example.com. The traffic may be received at the secure session server as a result of a client network application of the client device (e.g., a web browser) attempting to visit https://example.com. In one embodiment, the secure session server may act as a server for multiple domains that may belong to one or more domain owners.

The secure session server does not have local access to the private key that is used during the handshake procedure when establishing the secure session between the client device and the secure session server. For example, for some cipher suites, the private key is used to decrypt the premaster secret that has been encrypted with the corresponding public key by the client device. As another example, for other cipher suites (e.g., cipher suites that use Diffie-Hellman for the key exchange), the private key is used to sign a message that contains cryptographic parameters that are used to generate the premaster secret. In embodiments of the invention, the required private key is stored (or accessible) from a device remote to the secure session server, which is referred herein as the "key server." Upon a point during the handshake procedure where the private key is needed, the secure session server requests the key server to access and use the private key.

For example, if the premaster secret has been generated by the client and encrypted with a public key, the secure session server may request the key server to decrypt the premaster secret using the corresponding private key. The decrypted premaster secret is used by both the client device and secure session server to create a shared secret (referred to as a master secret) that is used when generating the session keys that are used to encrypt and decrypt data during the secure session. After receiving the encrypted premaster secret (which the secure session server cannot decrypt), the secure session server transmits the encrypted premaster secret to the key server, which has access to the private key that can decrypt the encrypted premaster secret. The key server decrypts and transmits the premaster secret to the secure session server. The secure session server, after receiving the decrypted premaster secret from the key server, generates the master secret and uses the master secret to generate the session keys that are used to encrypt and decrypt data during the secure session. The key server may transmit the decrypted premaster secret to the secure session server over a secure session or otherwise in an encrypted form. The secure session server and client finish the secure session handshake and establish the secure session.

As another example, if the selected cipher suite is a Diffie-Hellman cipher suite that requires the cryptographic parameters used when generating the premaster secret to be signed with the private key, the secure session server requests the key server to sign the cryptographic parameters with the private key.

FIG. 1 illustrates exemplary messages for establishing a secure session using public-key cryptography between a client device 110 and a secure session server 120 where the secure session server 120 does not have access to the private key used during the secure session handshake according to one embodiment. The client device 110 is a computing device (e.g., desktop, laptop, smartphone, mobile phone, tablet, gaming system, set-top box, server, etc.) that includes the client network application 115 (e.g., a web browser or other application) that is capable of accessing network resources and is capable of acting as a client in a secure session. It should be understood that the use of the term "client device" herein does not require that the device be an end-user client device. Rather, the term "client device" is used herein to refer to a computing device that operates as a client in the client-server relationship of a secure session (e.g., SSL and/or TLS).

The secure session server 120 is a computing device that includes the secure session module 140 that establishes and maintains secure sessions with client devices (and potentially the key server 130). The secure session server 120 also includes one or more certificates 145. By way of example, the certificate(s) 145 includes a certificate that is bound with example.com. The certificate that is bound with example.com includes a public key. The secure session server 120 does not store the private key that corresponds with the public key for example.com. The key server 130 is a computing device that includes the private key(s) 150. By way of example, the private key(s) 150 include a private key that corresponds with the public key included in the certificate for example.com that is stored in the secure session server 120. The secure session module 150 of the secure session server 120 is configured to, upon a point during the handshake procedure where the private key (e.g., the private key 150) is needed, to transmit a request to the key server 130 to access and use that private key.

At operation 1.1, the client device 110 transmits a Client Hello message to the secure session server 120. The Client Hello message begins the secure session handshake. The client device 110 may transmit the Client Hello message to the secure session server 120 as a result of the client network application 115 attempting to visit a website that begins with HTTPS (e.g., https://example.com). In one embodiment, the Client Hello message is transmitted to the secure session server 120 as a result of a Domain Name System (DNS) request for the domain the client device 110 is attempting to connect to resolving to an IP address of the secure session server 120. The Client Hello message may include the following: an indication of the requested version of the SSL or TLS protocol, a requested session identifier used to identify the session connection, a list of cipher suites supported by the client device 110, a list of the compression methods supported by the client device 110, random data used for cryptographic purposes (ClientHello.random), and also may indicate whether and what type of extensions defined by the protocol that the client supports. A number of cipher suites may be used in embodiments described herein (e.g., TLS_RSA_WITH_RC4_128_SHA, TLS_RSA_WITH_RC4_128_MD5, TLS_RSA_WITH_3DES_EDE_CBC_SHA, TLS_RSA_WITH_DES_CBC_SHA, TLS_ECDHE_RSA_WITH_RC4_128_SHA; TLS_ECDHE_RSA_WITH_3DES_EDE_CBC_SHA; TLS_ECDHE_RSA_WITH_AES_128_CBC_SHA; TLS_ECDHE_RSA_WITH_AES_256_CBC_SHA; etc.).

In response to the Client Hello message, at operation 1.2 the secure session server 120 transmits a Server Hello message to the client device 110. The Server Hello message may include the version of the SSL or TLS protocol supported by the secure session server 120, a session identifier that will be used to identify the session, the selected cipher suite (selected from the list of cipher suites included in the Client Hello message), random data used for cryptographic purposes that is different than the random data included in the ClientHello message (sometimes referred to as ServerHello.random), and may also include a list of the extensions that the server supports.

The secure session server 120 also transmits a Certificate message to the client device 110 at operation 1.3 (a server Certificate). The Certificate message includes a digital certificate for the requested domain. For example, if the requested domain is example.com, the Certificate message includes a digital certificate bound to example.com. The digital certificate includes, among other things, a public key. At operation 1.4, the secure session server 120 transmits a Server Hello Done message to the client device 110 that indicates that the hello-message phase of the handshake is complete.

At operation 1.5, the client 110 transmits a Client Key Exchange message to the secure session server 120. The Client Key Exchange message includes a random value called a premaster secret that has been encrypted using the public key included in the Certificate message of operation 1.3. By way of a specific example, if the RSA algorithm is being used for key agreement and authentication, the client device 110 generates a 48-byte value for the premaster secret and encrypts it using the public key from the server's certificate and transmits the encrypted premaster secret to the secure session server 120. As will be described below, the decrypted premaster secret is used to generate a shared secret between the client device 110 and the secure session server 120 (called the master secret), which is then used when generating the encryption and decryption keys used to encrypt and decrypt data transmitted during the secure session. It should be understood that if the encrypted premaster secret cannot be decrypted, then the handshake will fail and the secure session will not be established.

The secure session server 120 does not have the private key to decrypt the premaster secret. However, the private key is stored on the key server 130 (as one of the private key(s) 150). Although FIG. 1 illustrates the key server 130 storing the private keys, in other embodiments the key server 130 has access to the private keys but those private keys are stored on a different device. At operation 1.6, the secure session server 120 transmits the encrypted premaster secret to the key server 130. The key server 130 decrypts the encrypted premaster secret using the private key for the requested domain. The key server 130 then transmits the decrypted premaster secret to the secure session server 120 at operation 1.7. In one embodiment, the messages of operations 1.6 and 1.7 are transmitted over a secure connection 155 (e.g., encrypted using SSL or TLS, or other mechanisms) and/or the encrypted premaster secret and the decrypted premaster secret are otherwise encrypted.

In one embodiment, the key server 130 stores or has access to private keys for multiple domains and/or zones, which may be owned or controlled by different entities. For example, the key server 130 may store or have access to the private key for example.com and example2.com. In such an embodiment, in conjunction with transmitting the encrypted premaster secret to the key server 130, the secure session server 120 indicates the domain or zone in which the client device 110 is requesting a connection. For example, if the client device 110 is requesting a secure session with example.com, then the secure session server 120 indicates to the key server 130 that example.com is the requested domain. The client device 110 may specify the destination domain using the Server Name Indication (SNI) extension in the Client Hello message. SNI is described in RFC 3546, June 2003. If the destination is not specified by the client device 110 (e.g., the client device 110 does not support SNI), then the secure session server 120 matches the destination IP address of the client-hello message sent by the client device 110 with the corresponding hostname (e.g., the secure session server 120 may include a mapping of IP addresses and hostnames). The secure session server 120 may transmit the indication of the domain or zone name to the key server 130 in a number of different ways including in a header, a custom binary structure, or a serialization format (e.g., protobuf, JavaScript Object Notation (JSON), etc.). After receiving the indication of the domain or zone name in which the client is attempting to connect, the key server 130 accesses the corresponding private key and decrypts the encrypted premaster secret.

The secure session server 120 uses the decrypted premaster secret to calculate the master secret. The client device 110 and the secure session server 120 use the same algorithm and data to calculate the same master secret. By way of example, the master secret is calculated using a pseudorandom function that takes as input the premaster secret, the ClientHello.random value, and the ServerHello.random value.

The master secret is used by the client device 110 and the secure session server 120 to generate session keys that are used to encrypt and decrypt information during the secure session. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

At operation 1.8, the client device 110 transmits a Change Cipher Spec message to the secure session server 120. The Change Cipher Spec message from the client device 110 indicates that future messages transmitted by the client device 110 will be encrypted. At operation 1.9, the client device 110 transmits a Finished message to the secure session server 120. The Finished message is encrypted using the generated session keys. By way of example, the Finished message includes an encrypted hash of all of the messages in the handshake previously sent and received.

At operation 1.10, the secure session server 120 transmits a Change Cipher Spec message to the client device 110 that indicates that future messages transmitted by the secure session server 120 will be encrypted. At operation 1.11, the secure session server 120 transmits a Finished message to the client device 110. The Finished message may include an encrypted hash of all of the messages in the handshake previously sent and received.

After the Finished message of operation 1.11, the handshake is complete and the secure session 160 is considered to be established. At operation 1.12, future messages of the secure session between the client device 110 and secure session server 120 are encrypted over the secure session 160, which carry the application data of the connection.

As described above, the connection between the secure session server 120 and the key server 130 may be a secure connection for securely transmitting the decrypted premaster secret and optionally securely transmitting the encrypted premaster secret. As described above, a secure session (e.g., SSL or TLS) may be established between the secure session server 120 and the key server 130. As part of establishing the secure session, the key server 130 may request a client certificate from the secure session server 120 and the secure session server 120 may transmit a client Certificate message that includes its certificate to the key server 130. The data in the client Certificate message is used by the key server 130 to authenticate the identity of the secure session server 120.

In some embodiments, the key server 130 may use IP address blocking to accept connections (such as from the secure session server 120) from only certain IP addresses. For example, the key server 130 may have a whitelist of IP address(es) and/or IP address range(s) that are allowed to connect to the key server 130 or have a blacklist of IP address(es) and/or IP address range(s) that are not allowed to connect to the key server 130. IP address blocking may also be used at one or more intermediary network devices between the secure session server 120 and the key server 130.

Although a secure session has been described between the secure session server 120 and the key server 130 that is initiated by the secure session server 120, in other embodiments the secure session can be initiated by the key server 130.

A combination of the security techniques described may be used to provide security for the decrypted premaster secret. For example, a combination of requiring a client Certificate and IP address blocking may be used to provide security for the connection between the secure session server 120 and the key server 130.

In one embodiment, the secure connection 155 between the secure session server 120 and the key server 130 may be a Virtual Private Network (VPN) connection, which may be desirable in a firewalled environment.

Figure 2:
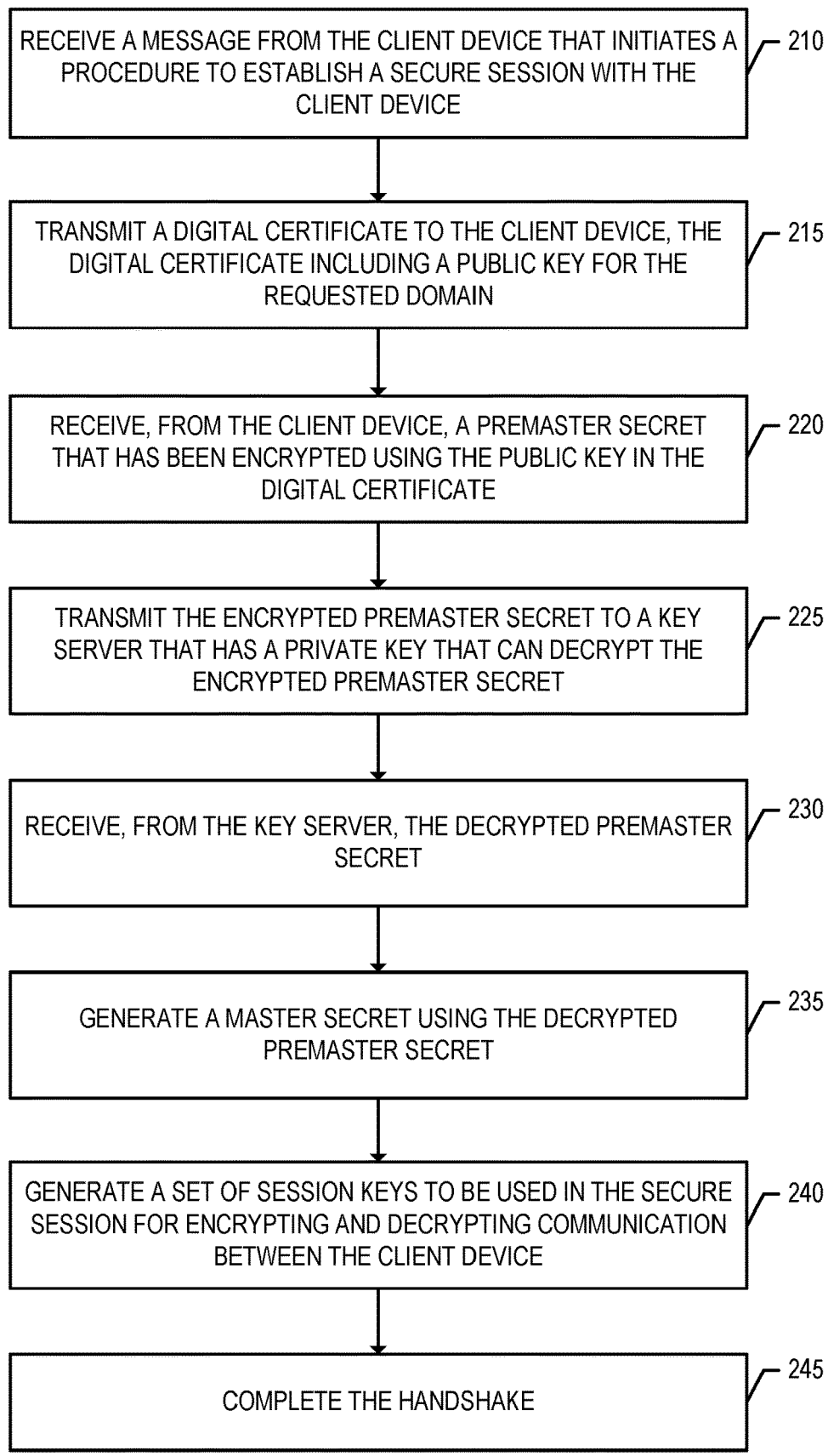
FIG. 2 is a flow diagram that illustrates exemplary operations for establishing a secure session implemented with public-key cryptography between a client device and a secure session server where the secure session server does not have access to a private key for the requested domain according to one embodiment.

FIG. 2 is a flow diagram that illustrates exemplary operations for establishing a secure session implemented with public-key cryptography between a client device and a secure session server where the secure session server does not have access to a private key for the requested domain according to one embodiment. The private key is stored remotely from the secure session server (e.g., on a key server).

At operation 210, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 210, the secure session server may perform a number of operations, including transmitting a digital certificate to the client device at operation 215. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 210 indicates the destination domain, the secure session server transmits the digital certificate bound to that destination domain. If the message in operation 210 does not indicate the destination host name, the secure session server transmits the digital certificate that is associated with the destination IP address of the message in operation 210, which is bound to the requested domain. Flow moves from operation 215 to operation 220.

At operation 220, the secure session server receives from the client device a premaster secret that has been encrypted using the public key in the digital certificate transmitted in operation 215. The encrypted premaster secret may be sent by the client device in a SSL or TLS Client Key Exchange message. Flow moves from operation 220 to operation 225.

The secure session server does not have the private key that corresponds with the public key that encrypted the premaster secret. As a result, the secure session server cannot decrypt the encrypted premaster secret to obtain the premaster secret. At operation 225, the secure session server transmits the encrypted premaster secret to a key server that has the private key that can decrypt the encrypted premaster secret. In one embodiment, the key server is located remotely from the secure session server. Moreover, in some embodiments, the secure session server and the key server may be owned and/or operated by different entities. For example, the secure session server may not be under physical control of the owner of the requested domain while the key server is under physical control of the owner of the requested domain. In one embodiment, the encrypted premaster secret is transmitted to the key server over a secure connection (e.g., encrypted using SSL or TLS) and/or is otherwise encrypted. Flow moves from operation 225 to operation 230.

Figure 3:
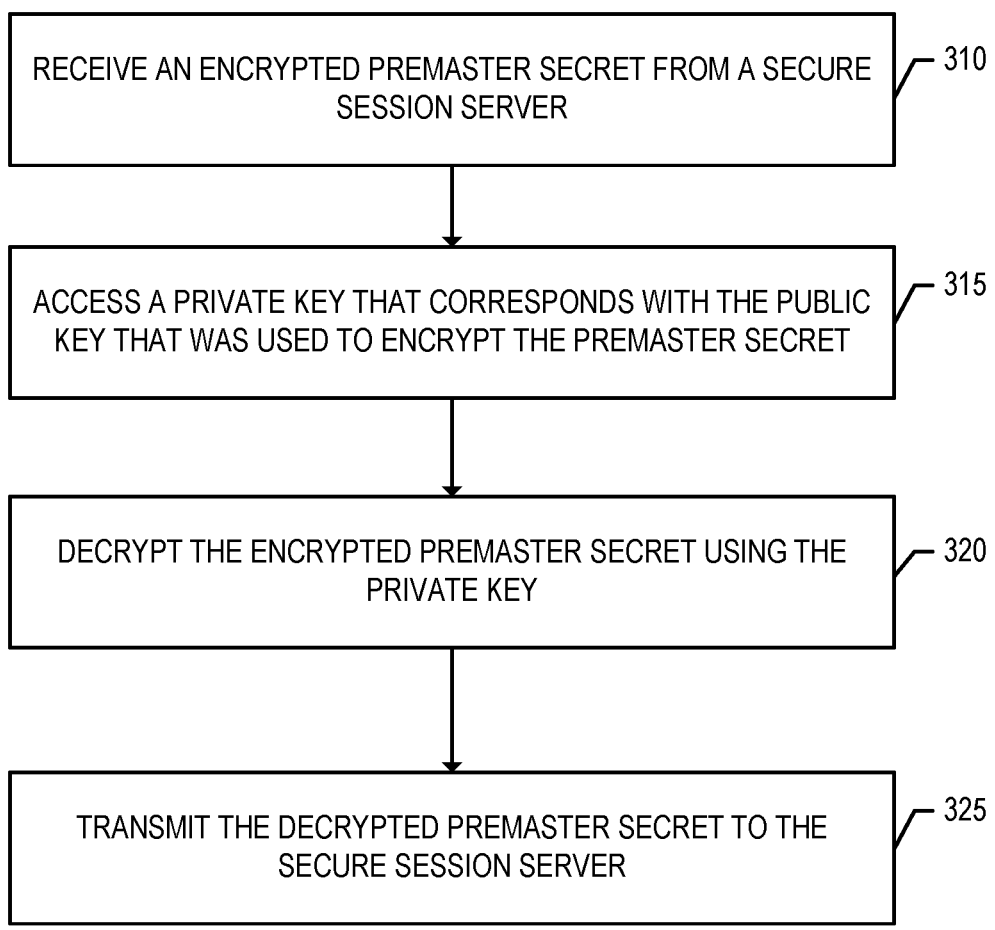
FIG. 3 is a flow diagram that illustrates exemplary operations performed by a key server in response to receiving an encrypted premaster secret from a secure session server according to one embodiment.

In response to receiving the encrypted premaster secret, the key server decrypts the encrypted premaster secret and obtains the premaster secret. FIG. 3 is a flow diagram that illustrates exemplary operations performed by a key server in response to receiving an encrypted premaster secret from a secure session server according to one embodiment. At operation 310, the key server receives an encrypted premaster secret from the secure session server. For example, the key server receives the encrypted premaster secret transmitted by the secure session server in operation 225 of FIG. 2.

Flow then moves to operation 315 where the key server accesses a private key that corresponds with the public key that was used to encrypt the premaster secret. The key server may receive from the secure session server an indication of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key that encrypted the premaster secret.

Flow then moves to operation 320 where the key server decrypts the encrypted premaster secret using the accessed private key. Flow then moves to operation 325 where the key server transmits the decrypted premaster secret to the secure session server.

As described above, the key server may transmit the decrypted premaster secret to the secure session over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, any combination of these security techniques may be used to secure the transmission of the decrypted premaster secret.

Referring back to FIG. 2, at operation 230, the secure session server receives the decrypted premaster secret from the key server. In one embodiment, the decrypted premaster secret is transmitted to the key server over a secure connection (e.g., encrypted using SSL or TLS) and/or is otherwise encrypted such that the secure session server is able to decrypt the message. Flow moves from operation 230 to operation 235.

After obtaining the decrypted premaster secret from the key server, the secure session server can proceed with the secure session handshake with the client device and establish the secure session. For example, at operation 235, the secure session server generates a master secret using the decrypted premaster secret. The client device also generates the same master secret.

Flow then moves to operation 240 where the secure session server generates a set of session keys to be used in the secure session when encrypting and decrypting information. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 240 to operation 245 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

Figure 4:
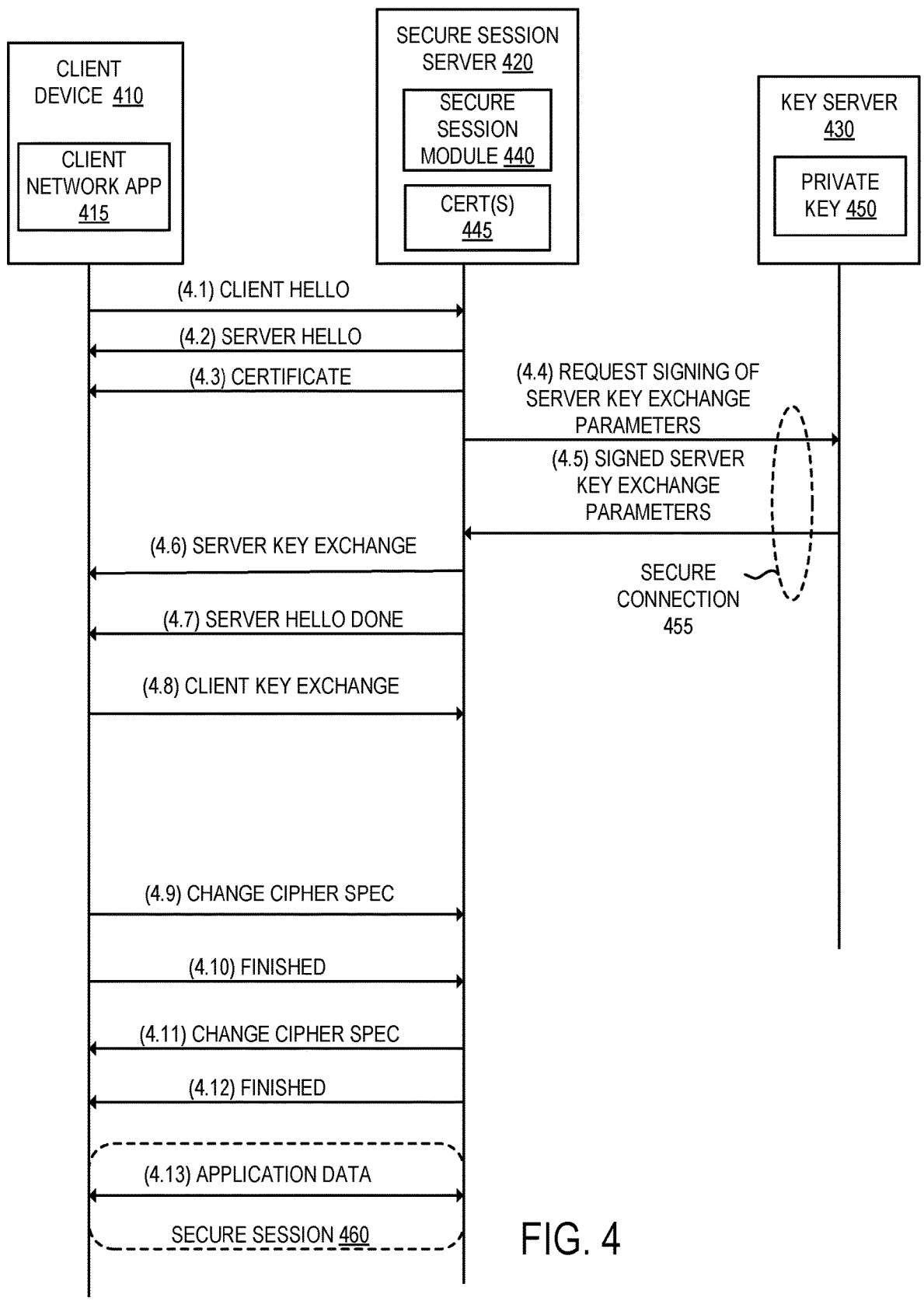
FIG. 4 illustrates exemplary messages for establishing a secure session using public-key cryptography between a client device and a secure session server where the secure session server does not have access to the private key used during the secure session handshake according to another embodiment.

FIG. 4 illustrates exemplary messages for establishing a secure session using public-key cryptography between a client device 410 and a secure session server 420 where the secure session server 420 does not have access to the private key used during the secure session handshake according to one embodiment. The embodiment described in FIG. 4 describes the messages for establishing a secure session where the cipher suite chosen requires the use of a Server Key Exchange message (e.g., a Diffie-Hellman cipher suite is used). The client device 410 (including the client network application 415) is similar to the client device 110 of FIG. 1. The secure session server 420, including the secure session module 440 and the certificate(s) 445, are similar to the secure session server 120 (including the secure session module 140 and the certificate(s) 145), but perform different operations as will be described below. The key server 430 is similar to the key server 130 of FIG. 1, but performs different operations as will be described below.

At operation 4.1, the client device 410 transmits a Client Hello message to the secure session server 420. This Client Hello message is similar to the Client Hello message described in operation 1.1 of FIG. 1. In response to the Client Hello message, at operation 4.2 the secure session server 420 transmits a Server Hello message to the client device 410. This Server Hello message is similar to the Server Hello message described in operation 1.2 of FIG. 1. The secure session server 420 also transmits a Certificate message to the client device 410 at operation 4.3 (a server Certificate). This Certificate message is similar to the Certificate message described in operation 1.3 of FIG. 1.

Although not illustrated in FIG. 4, the secure session server 420 has selected a cipher suite that has a key exchange in which the certificate message transmitted in operation 4.3 does not include enough data to allow the client device 410 to generate a premaster secret. For example, the selected cipher suite may use Diffie-Hellman as the key exchange mechanism (e.g., DHE_RSA, DHE_DSS). Because of this, the secure session server 420 will transmit a message to the client device 410 that conveys cryptographic information to allow the client device 410 and the secure session server 420 to each generate the same premaster secret. By way of a specific example where the key exchange mechanism is Diffie-Hellman, the cryptographic information includes a set of cryptographic parameters that may include the following: the prime modulus used for the Diffie-Hellman operation (p), the generator used for the Diffie-Hellman operation (g), and a Diffie-Hellman public value of the server ($\hat{}$X mod p, where X is the Diffie-Hellman private value of the server). The message that conveys the cryptographic information is referred to as a Server Key Exchange message. The Server Key Exchange message may need to be signed with the private key 450 corresponding to the public key of the server transmitted in the Certificate message transmitted in operation 4.3 (e.g., if the key exchange mechanism is DHE_RSA or DHE_DSS). As similarly described with respect to the embodiment discussed in FIG. 1, the secure session server 420 does not have local access to this private key 450. As a result, the secure session server 420 cannot sign the Server Key Exchange message with this private key 450.

Since the secure session server 420 does not have local access to the private key 450, at operation 4.4 the secure session server 420 transmits a request to the key server 430 to sign the cryptographic parameters of the Server Key Exchange message with the private key 450.

In one embodiment, the secure session server 420 generates these cryptographic parameters (and selects the server's private value used in the Diffie-Hellman operation) and transmits these cryptographic parameters and any other required information (e.g., the ClientHello.random and ServerHello.random values) to the key server 430 to sign using the private key 450. In this embodiment, the private key 450 is typically an RSA key if the key exchange mechanism is DHE_RSA or is a Digital Signature Algorithm (DSA) key if the key exchange mechanism is DHE_DSS.

The key server 430 transmits the result of the signed server key exchange parameters to the secure session server 420 at operation 4.5. In one embodiment, the messages of operations 4.4 and 4.5 are transmitted over a secure connection 455 (e.g., encrypted using SSL or TLS, or other mechanisms) and/or are otherwise encrypted.

At operation 4.6, the secure session server 420 transmits the Server Key Exchange message to the client device 410, which includes the signed cryptographic parameters. The secure session server 420 also transmits a Server Hello Done message to the client device 410 at operation 4.7 that indicates that the hello-message phase of the handshake is complete.

The client device 410 authenticates the information in the Server Key Exchange message using the corresponding public key (e.g., the public key received in the Certificate message transmitted in operation 4.3). Assuming that the information is authenticated, the client device 410 generates the premaster secret using that information. The client transmits the Client Key Exchange message in operation 4.8.

Unlike the Client Key Exchange message of FIG. 1, this Client Key Exchange message transmitted in operation 4.8 does not include the premaster secret. Rather, this Client Key Exchange message includes the information necessary for the server (the secure session server 420) to generate the same premaster secret (e.g., it includes the client's Diffie-Hellman public value). For example, in an embodiment where the secure session server 420 generates the Diffie-Hellman cryptographic parameters, the secure session server 420 generates the premaster secret using the client's Diffie-Hellman public value (received in the Client Key Exchange message) and its Diffie-Hellman private value.

The secure session server 420 uses the premaster secret to calculate the master secret. The client device 410 and the secure session server 420 use the same algorithm and data to calculate the same master secret. By way of example, the master secret is calculated using a pseudorandom function that takes as input the premaster secret, the ClientHello.random value, and the ServerHello.random value. The master secret is used by the client device 410 and the secure session server 420 to generate session keys that are used to encrypt and decrypt information during the secure session. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

At operation 4.9, the client device 410 transmits a Change Cipher Spec message to the secure session server 420. The Change Cipher Spec message from the client device 410 indicates that future messages transmitted by the client device 410 will be encrypted. At operation 4.10, the client device 410 transmits a Finished message to the secure session server 420. The Finished message is encrypted using the generated session keys. By way of example, the Finished message includes an encrypted hash of all of the messages in the handshake previously sent and received.

At operation 4.11, the secure session server 420 transmits a Change Cipher Spec message to the client device 410 that indicates that future messages transmitted by the secure session server 420 will be encrypted. At operation 4.12, the secure session server 420 transmits a Finished message to the client device 410. The Finished message may include an encrypted hash of all of the messages in the handshake previously sent and received.

After the Finished message of operation 4.12, the handshake is complete and the secure session 460 is considered to be established. At operation 4.13, future messages during the session between the client device 110 and secure session server 120 are encrypted over the secure session 160, which carry the application data of the connection.

Figure 5:
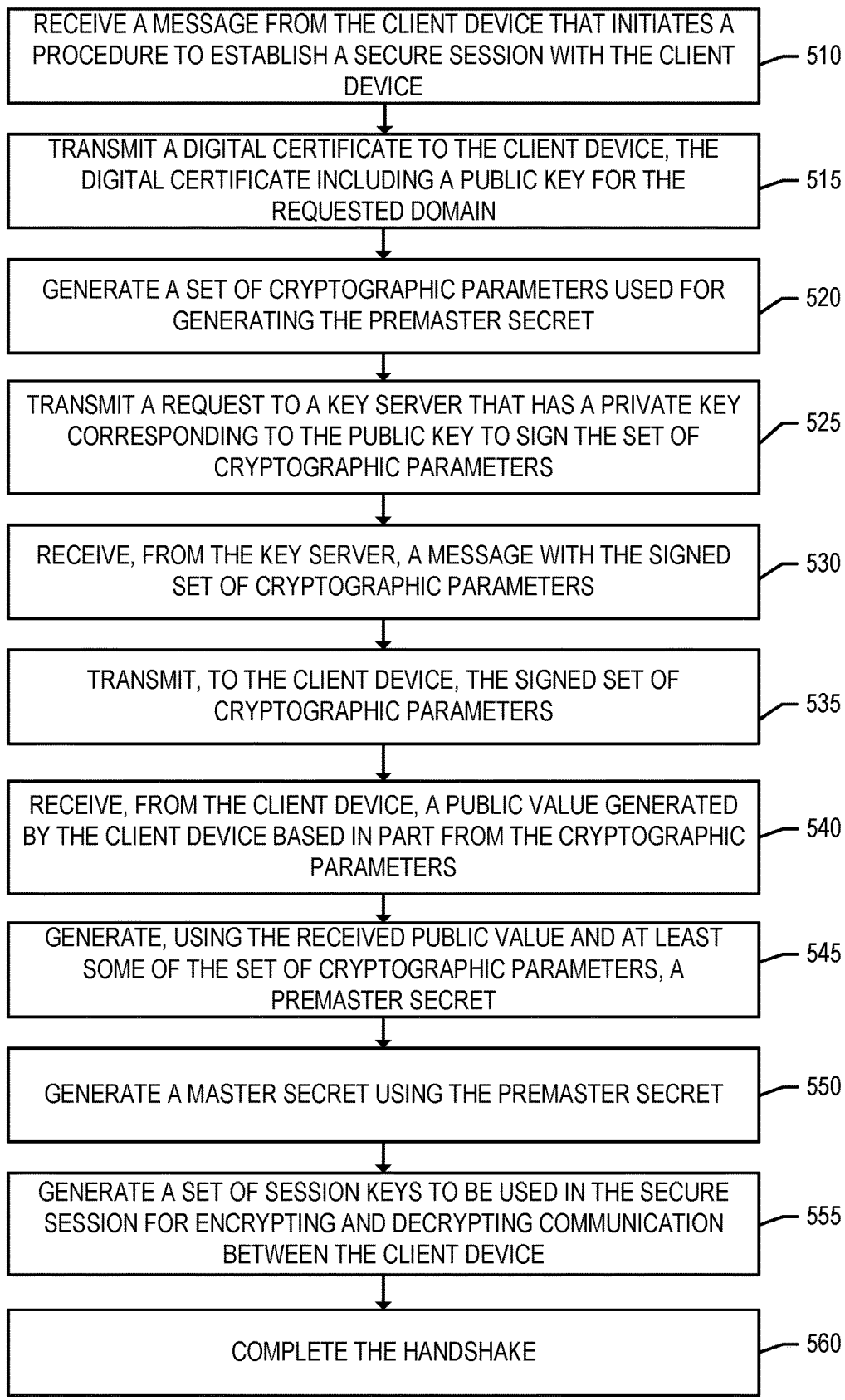
FIG. 5 is a flow diagram that illustrates exemplary operations for establishing a secure session implemented with public-key cryptography between a client device and a secure session server where the secure session server does not have access to the private key used during the secure session handshake according to one embodiment.

FIG. 5 is a flow diagram that illustrates exemplary operations for establishing a secure session implemented with public-key cryptography between a client device and a secure session server where the secure session server does not have access to the private key used during the secure session handshake according to one embodiment.

At operation 510, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 510, the secure session server may perform a number of operations, including transmitting a digital certificate to the client device at operation 515. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 510 indicates the destination domain, the secure session server transmits the digital certificate bound to that destination domain. If the message in operation 510 does not indicate the destination host name, the secure session server transmits the digital certificate that is associated with the destination IP address of the message in operation 510, which is bound to the requested domain. Flow moves from operation 515 to operation 520.

In the embodiment of FIG. 5, the secure session server has selected a cipher suite that has a key exchange in which the certificate message transmitted by the secure session server does not include enough data to allow the client device to generate a premaster secret. For example, the selected cipher suite may use Diffie-Hellman as the key exchange mechanism (e.g., DHE_RSA or DHE_DSS).

At operation 520, the secure session server generates a set of cryptographic parameters used for generating the premaster secret for the selected key exchange message. By way of a specific example where the key exchange mechanism is Diffie-Hellman, the cryptographic parameters may include the following: the prime modulus used for the Diffie-Hellman operation (p), the generator used for the Diffie-Hellman operation (g), and a Diffie-Hellman public value of the secure session server (g^X mod p, where X is the Diffie-Hellman private value selected by the secure session server). Flow moves from operation 520 to operation 525.

The set of cryptographic parameters will be included in a message to be transmitted to the client device. Depending on the selected cipher suite, these cryptographic parameters may be required to be signed (e.g., with the private key that corresponds to the public key for the requested domain). The secure session server does not have local access to the private key (e.g., it is stored on a key server that is located remotely from the secure session server). At operation 525, the secure session server transmits a request to a key server to sign the set of cryptographic parameters with a private key that corresponds to the public key for the requested domain. In addition to the cryptographic parameters, the request may also include one or more random values that are also signed (e.g., the ClientHello.random and ServerHello.random values). The signed set of cryptographic parameters will be included in a message to the client device in which the client device authenticates. Flow moves from operation 525 to operation 530.

Figure 6:
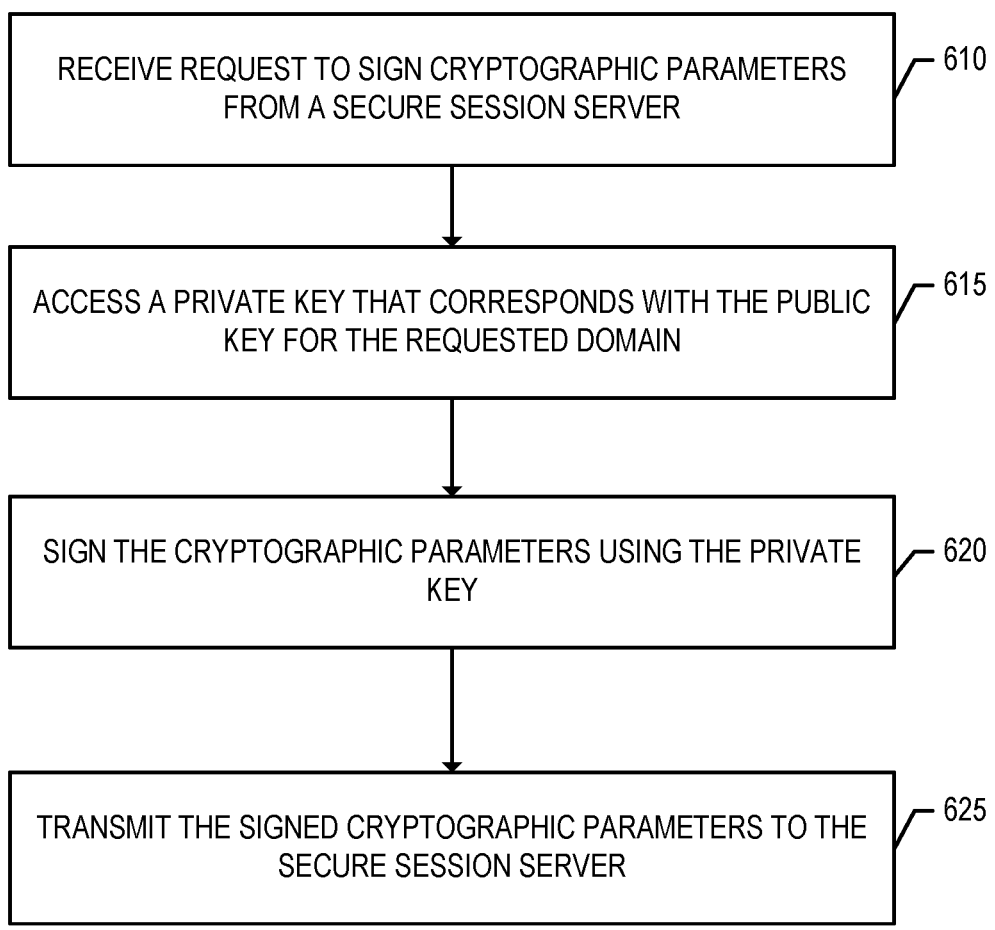
FIG. 6 is a flow diagram that illustrates exemplary operations performed by a key server in response to receiving a request to sign cryptographic parameters from a secure session server according to one embodiment.

FIG. 6 is a flow diagram that illustrates exemplary operations performed by a key server in response to receiving a request to sign cryptographic parameters from a secure session server according to one embodiment. At operation 610, the key server receives a request to sign cryptographic parameters from a secure session server. For example, the key server receives the request transmitted by the secure session server in operation 525 of FIG. 5.

Flow then moves to operation 615 where the key server accesses a private key that corresponds with the public key for the requested domain. The key server may receive an indication from the secure session server of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key for the requested domain. Flow then moves to operation 620.

At operation 620, the key server signs the cryptographic parameters using the accessed private key. Flow then moves to operation 625 where the key server transmits the signed cryptographic parameters to the secure session server.

The key server may transmit the signed cryptographic parameters over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a Virtual Private Network (VPN) connection. In some embodiments, any combination of these security techniques may be used to secure the transmission of the signed cryptographic parameters.

Referring back to FIG. 5, at operation 530, the secure session server receives, from the key server, a message with the signed set of cryptographic parameters. Flow then moves to operation 535 where the secure session server transmits the signed set of cryptographic parameters to the client device. The signed set of cryptographic parameters may be transmitted to the client in a Server Key Exchange message. Flow moves from operation 535 to operation 540.

The client device will authenticate the information in the message (e.g., authenticate the signature) using the public key previously received from the server. Assuming that it is authenticated, the client device will generate the premaster secret using in part that information. The client device, however, does not communicate the premaster secret to the secure session server in this embodiment. Rather, it communicates the information necessary for the secure session server to generate the same premaster secret. For example, the client device transmits its Diffie-Hellman public value (generated in part from the set of cryptographic parameters received from the secure session server) to the secure session server. Thus, at operation 540, the secure session server receives a public value generated by the client device based in part on the cryptographic parameters (e.g., the client device's Diffie-Hellman public value). Flow moves from operation 540 to operation 545.

At operation 545, the secure session server generates the premaster secret (which should be the same premaster secret as generated by the client device) using the received public value and at least some of the cryptographic parameters. By way of a specific example, the secure session server generates the premaster secret by computing y^X mod p, where y is the public value of the client device, X is the private value of the secure session server, and p is the prime modulus value.

Flow moves from operation 545 to operation 550, where the secure session server generates a master secret using the premaster secret. The client device also generates the same master secret. Flow then moves to operation 555, where the secure session server generates a set of session keys to be used in the secure session when encrypting and decrypting information. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 555 to operation 560 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

Figure 7:
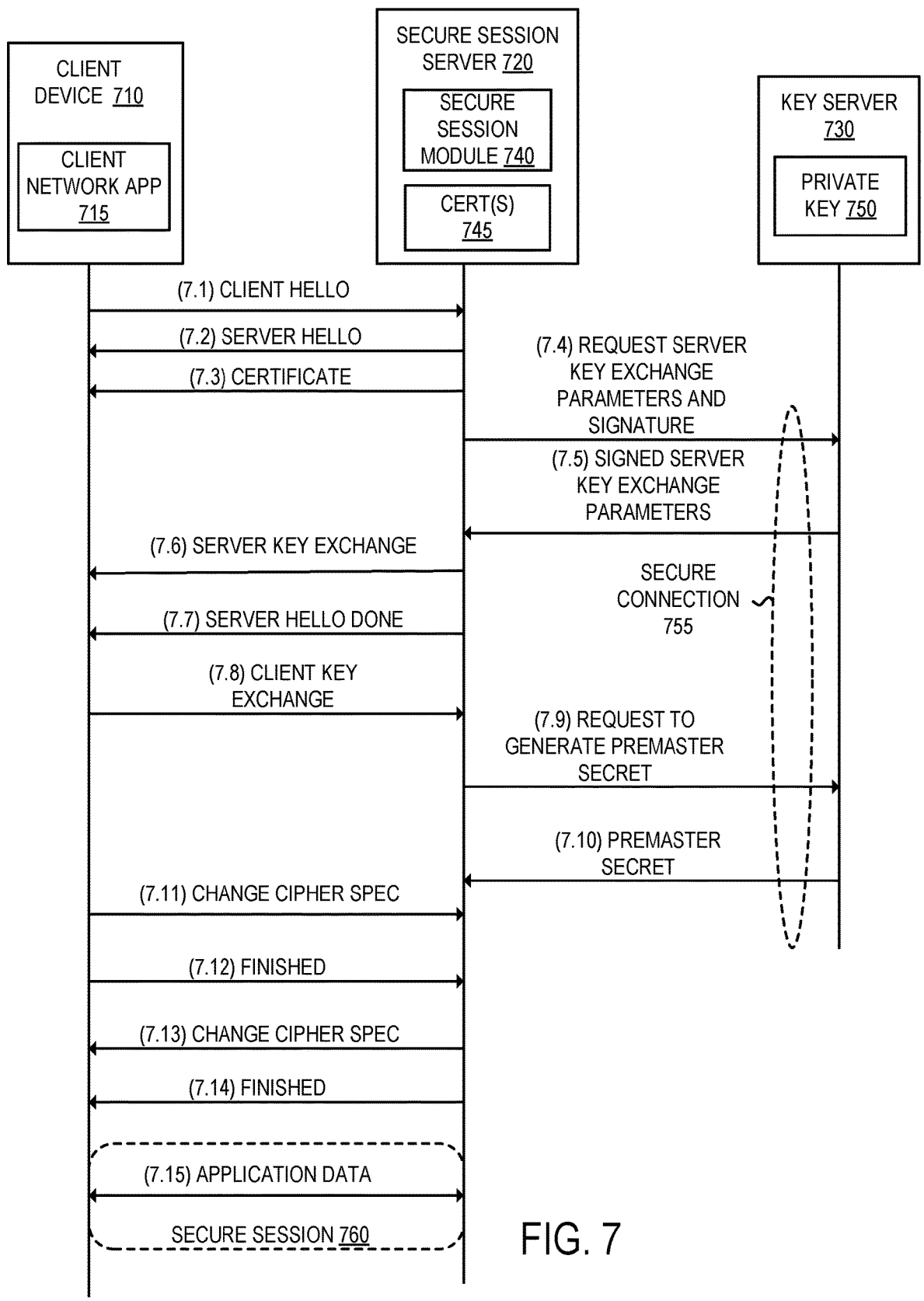
FIG. 7 illustrates another embodiment for establishing a secure session between a client device and a secure session server where the secure session server does not have access to the private key used during the secure session handshake.

FIG. 7 illustrates another embodiment for establishing a secure session between a client device and a secure session server where the secure session server does not have access to the private key used during the secure session handshake. Similar to the embodiment described in FIG. 4, the embodiment described in FIG. 7 describes the messages where the cipher suite chosen requires the use of a Server Key Exchange message (e.g., a Diffie-Hellman cipher suite is used). Unlike the embodiment described in FIG. 4, however, in the embodiment of FIG. 7, the key server generates the cryptographic parameters used during the key exchange. The client device 710 (including the client network application 715) is similar to the client device 110 of FIG. 1. The secure session server 720, including the secure session module 740 and the certificate(s) 745, are similar to the secure session server 120 (including the secure session module 140 and the certificate(s) 145), but perform different operations as will be described below. The key server 730 is similar to the key server 130 of FIG. 1, but performs different operations as will be described below.

At operation 7.1, the client device 710 transmits a Client Hello message to the secure session server 720. This Client Hello message is similar to the Client Hello message described in operation 1.1 of FIG. 1. In response to the Client Hello message, at operation 7.2 the secure session server 720 transmits a Server Hello message to the client device 710. This Server Hello message is similar to the Server Hello message described in operation 1.2 of FIG. 1. The secure session server 720 also transmits a Certificate message to the client device 710 at operation 7.3 (a server Certificate). This Certificate message is similar to the Certificate message described in operation 1.3 of FIG. 1.

Although not illustrated in FIG. 7, the secure session server 420 has selected a cipher suite that has a key exchange in which the certificate message transmitted in operation 7.3 does not include enough data to allow the client device 710 to generate a premaster secret. For example, the selected cipher suite may use Diffie-Hellman as the key exchange mechanism (e.g., DHE_RSA, DHE_DSS). Because of this, the secure session server 720 will transmit a message to the client device 710 that conveys cryptographic information to allow the client device 710 and the secure session server 720 to each generate the same premaster secret. By way of a specific example where the key exchange mechanism is Diffie-Hellman, the cryptographic information includes a set of cryptographic parameters that may include the following: the prime modulus used for the Diffie-Hellman operation (p), the generator used for the Diffie-Hellman operation (g), and a Diffie-Hellman public value of the server (g^X mod p, where X is the Diffie-Hellman private value of the server). The message that conveys the cryptographic information is referred to as a Server Key Exchange message. The Server Key Exchange message may need to be signed with the private key 750 corresponding to the public key of the server transmitted in the Certificate message transmitted in operation 7.3 (e.g., if the key exchange mechanism is DHE_RSA or DHE_DSS). As similarly described with respect to the embodiment discussed in FIG. 1, the secure session server 720 does not have local access to this private key 750. As a result, the secure session server 720 cannot sign the Server Key Exchange message with this private key 750.

At operation 7.4 the secure session server 720 transmits a request to the key server 730 to generate and sign the cryptographic parameters to be used in the Server Key Exchange message. The key server 730 generates the cryptographic parameters (the secure session server 420 may transmit any other required information such as the ClientHello.random and ServerHello.random values that may be used when signing) and signs the result using the private key 750. In this embodiment, the private key 750 is typically an RSA key if the key exchange mechanism is DHE_RSA or is a DSA key if the key exchange mechanism is DHE_DSS.

At operation 7.5, the key server 730 transmits the signed server key exchange parameters back to the secure session server 720. The secure session server 720 uses the signed parameters in the Server Key Exchange message transmitted to the client device 710 at operation 7.6. The secure session server 720 also transmits a Server Hello Done message to the client device 710 that indicates that the hello-message phase of the handshake is complete at operation 7.7.

The client device 710 authenticates the information in the Server Key Exchange message using the corresponding public key (e.g., the public key received in the Certificate message transmitted in operation 7.3). Assuming that the information is authenticated, the client device 710 generates the premaster secret using that information. The client transmits the Client Key Exchange message in operation 7.8.

This Client Key Exchange message includes the information necessary for the key server 430 to generate the same premaster secret (e.g., it includes the client's Diffie-Hellman public value). The secure session server 720 transmits a request to the key server 730 to generate the premaster secret using the client's public value at operation 7.9. The secure session server 720 generates the premaster secret using the client's public value and transmits the premaster secret to the secure session server 720 at operation 7.10.

The secure session server 720 uses the premaster secret to calculate the master secret. The client device 710 and the secure session server 720 use the same algorithm and data to calculate the same master secret. By way of example, the master secret is calculated using a pseudorandom function that takes as input the premaster secret, the ClientHello.random value, and the ServerHello.random value. The master secret is used by the client device 710 and the secure session server 720 to generate session keys that are used to encrypt and decrypt information during the secure session. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

At operation 7.11, the client device 710 transmits a Change Cipher Spec message to the secure session server 720. The Change Cipher Spec message from the client device 710 indicates that future messages transmitted by the client device 710 will be encrypted. At operation 7.12, the client device 710 transmits a Finished message to the secure session server 720. The Finished message is encrypted using the generated session keys. By way of example, the Finished message includes an encrypted hash of all of the messages in the handshake previously sent and received.

At operation 7.13, the secure session server 720 transmits a Change Cipher Spec message to the client device 710 that indicates that future messages transmitted by the secure session server 720 will be encrypted. At operation 7.14, the secure session server 720 transmits a Finished message to the client device 710. The Finished message may include an encrypted hash of all of the messages in the handshake previously sent and received.

After the Finished message of operation 7.14, the handshake is complete and the secure session 760 is considered to be established. At operation 7.15 future messages during the session between the client device 110 and secure session server 120 are encrypted over the secure session 760, which carry the application data of the connection.

In one embodiment, the messages transmitted in operations 7.4, 7.5, 7.9, and 7.10 are transmitted over a secure connection 755 (e.g., encrypted using SSL or TLS, or other mechanisms) and/or are otherwise encrypted.

Figure 8:
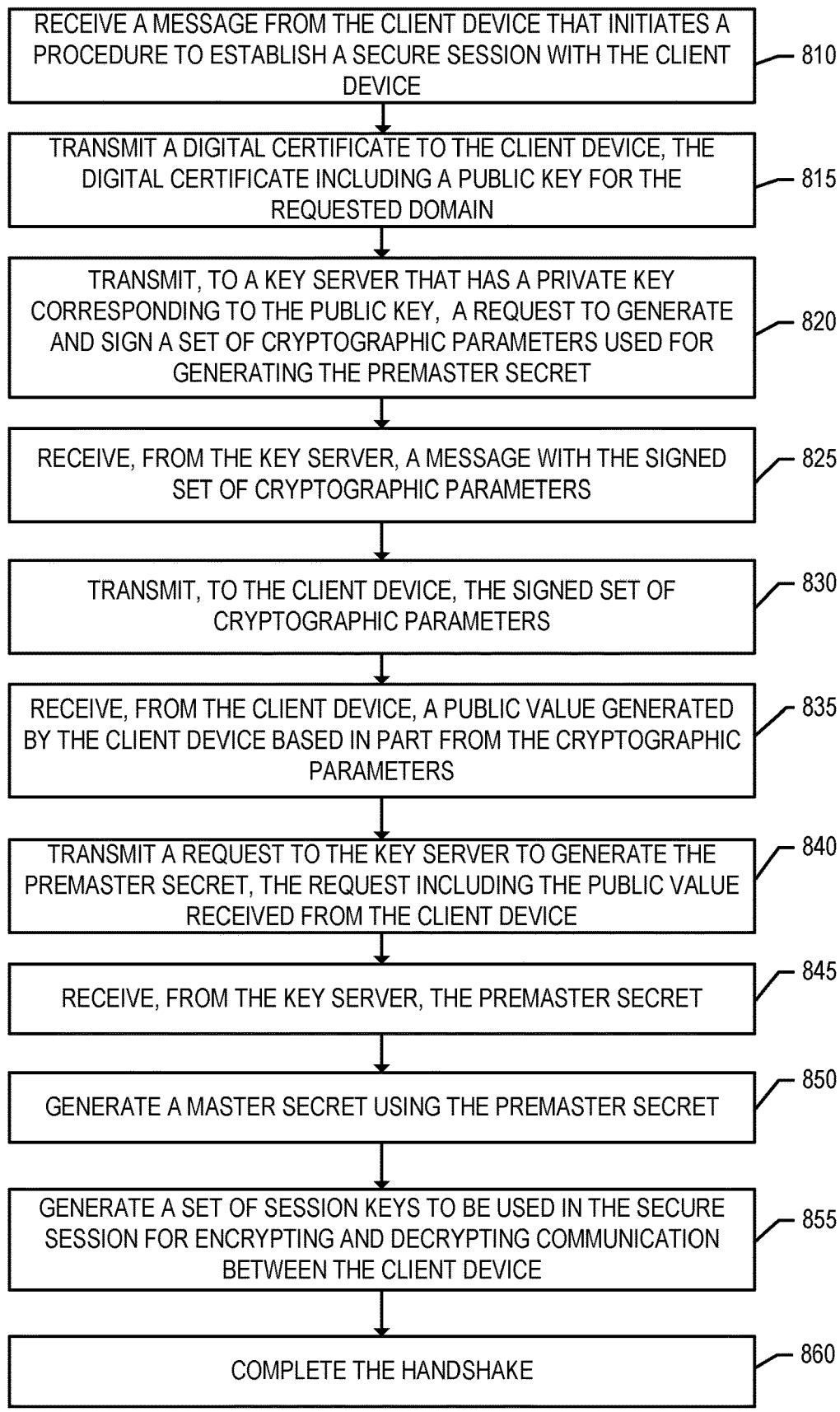
FIG. 8 is a flow diagram that illustrates exemplary operations for establishing a secure session implemented with public-key cryptography between a client device and a secure session server where the secure session server does not have access to the private key used during the secure session handshake according to another embodiment.

FIG. 8 is a flow diagram that illustrates exemplary operations for establishing a secure session implemented with public-key cryptography between a client device and a secure session server where the secure session server does not have access to the private key used during the secure session handshake according to another embodiment. At operation 810, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 810, the secure session server may perform a number of operations, including transmitting a digital certificate to the client device at operation 815. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 810 indicates the destination domain, the secure session server transmits the digital certificate bound to that destination domain. If the message in operation 810 does not indicate the destination host name, the secure session server transmits the digital certificate that is associated with the destination IP address of the message in operation 810, which is bound to the requested domain. Flow moves from operation 815 to operation 820.

In the embodiment of FIG. 8, the secure session server has selected a cipher suite that has a key exchange in which the certificate message transmitted by the secure session server does not include enough data to allow the client device to generate a premaster secret. For example, the selected cipher suite may use Diffie-Hellman as the key exchange mechanism (e.g., DHE_RSA or DHE_DSS).

In contrast to the embodiment described with reference to FIG. 5, the secure session server does not generate the set of cryptographic parameters used for generating the premaster secret. Instead, the key server generates these cryptographic parameters. At operation 820, the secure session server transmits a request to generate and sign a set of cryptographic parameters used for generating the premaster secret to the key server. The request may also include one or more random values that are also signed (e.g., the ClientHello.random and ServerHello.random values). Floe moves from operation 820 to operation 825.

Figure 9:
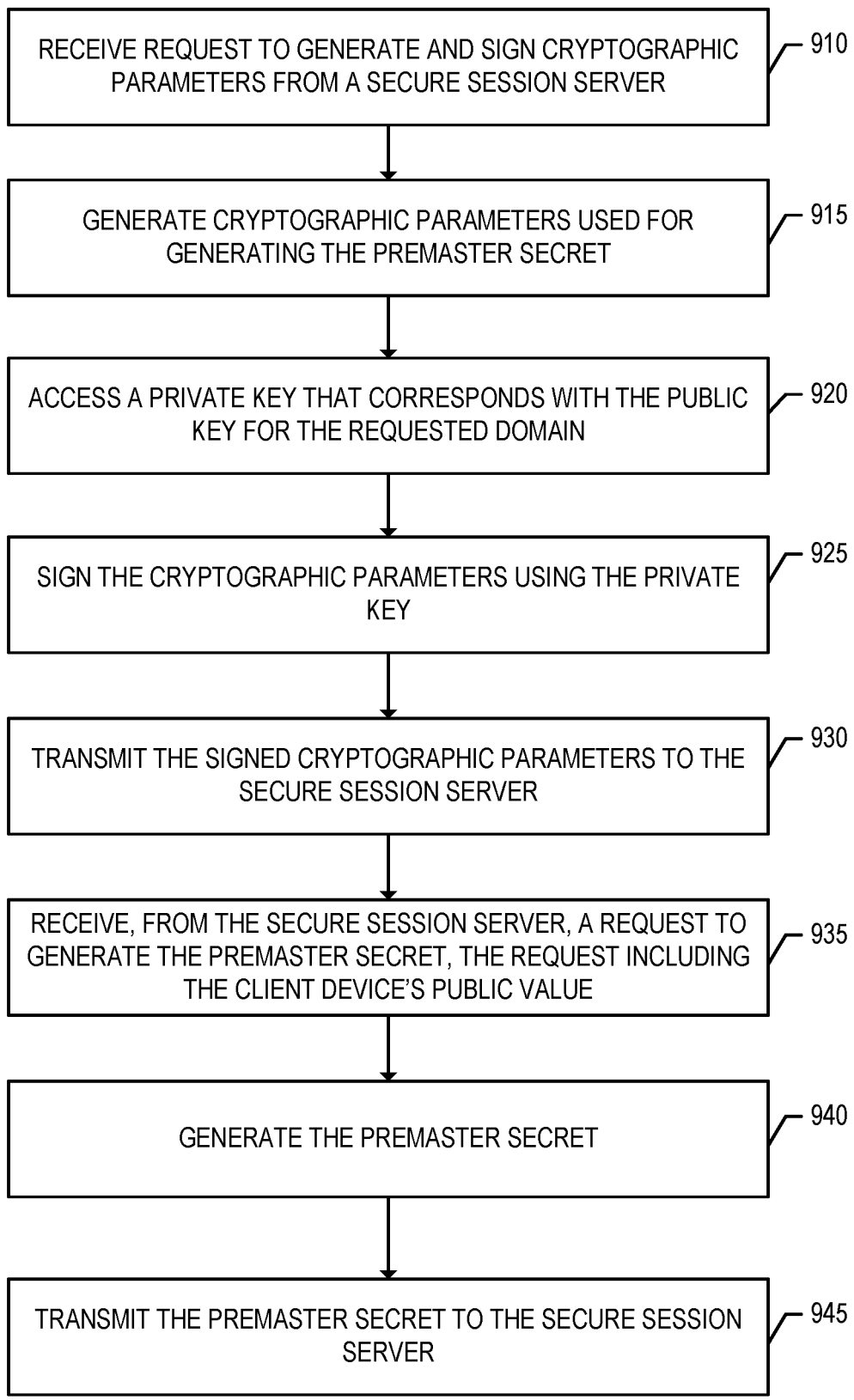
FIG. 9 is a flow diagram that illustrates exemplary operations performed by a key server according to one embodiment.

FIG. 9 is a flow diagram that illustrates exemplary operations performed by a key server according to one embodiment. At operation 910, the key server receives a request from a secure session server to generate and sign cryptographic parameters to be used during generating the premaster secret. For example, the key server receives the request transmitted by the secure session server in operation 820 of FIG. 8. Flow then moves to operation 915 where the key server generates the cryptographic parameters used for generating the premaster secret. By way of a specific example where the key exchange mechanism is Diffie-Hellman, the cryptographic parameters may include the following: the prime modulus used for the Diffie-Hellman operation (p), the generator used for the Diffie-Hellman operation (g), and a Diffie-Hellman public value of the key server (g^X mod p, where X is the Diffie-Hellman private value selected by the key server). Flow moves from operation 915 to operation 920.

At operation 920, the key server accesses a private key that corresponds with the public key for the requested domain. The key server may receive an indication from the secure session server of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key for the requested domain. Flow then moves to operation 925.

At operation 925, the key server signs the cryptographic parameters using the accessed private key. Flow then moves to operation 930 where the key server transmits the signed cryptographic parameters to the secure session server.

Referring back to FIG. 8, at operation 825, the secure session server receives a message with the signed set of cryptographic parameters from the key server. Flow then moves to operation 830 where the secure session server transmits the signed set of cryptographic parameters to the client device. The signed set of cryptographic parameters may be transmitted to the client in a Server Key Exchange message. Flow moves from operation 830 to operation 835.

The client device will authenticate the information in the message (e.g., authenticate the signature) using the public key previously received from the server. Assuming that it is authenticated, the client device will generate the premaster secret using in part that information. The client device, however, does not communicate the premaster secret to the secure session server in this embodiment. Rather, it communicates the information necessary for the secure session server to generate the same premaster secret. For example, the client device transmits its Diffie-Hellman public value (generated in part from the set of cryptographic parameters received from the secure session server) to the secure session server. Thus, at operation 835, the secure session server receives a public value generated by the client device based in part on the cryptographic parameters (e.g., the client device's Diffie-Hellman public value). Flow moves from operation 835 to operation 840.

At operation 840, the secure session server transmits a request to the key server to generate the premaster secret. This request includes the public value received from the client device.

Referring back to FIG. 9, the key server receives the request to generate the premaster secret in operation 935. Flow then moves to operation 940 and the key server generates the premaster secret using the received public value and at least some of the generated cryptographic parameters. For example, the key server generates the premaster secret by computing y^X mod p, where y is the public value of the client device, X is the private value of the key server, and p is the prime modulus value. Flow then moves to operation 945 where the key server transmits the premaster secret to the secure session server.

Referring back to FIG. 8, at operation 845, the secure session server receives the premaster secret from the key server. Flow then moves to operation 850 and the secure session server generates a master secret using the premaster secret. The client device also generates the same master secret. Flow then moves to operation 855, where the secure session server generates a set of session keys to be used in the secure session when encrypting and decrypting information. By way of a specific example, the master key is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 855 to operation 860 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

The key server may transmit the signed cryptographic parameters and/or the premaster secret over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, any combination of these security techniques may be used to secure the transmission of the signed cryptographic parameters.

In another embodiment, the secure session server may request the key server to generate and sign the cryptographic parameters necessary to generate the premaster secret and may also request and receive the key server's chosen private value used to generate the premaster secret. In such an embodiment, the secure session server can generate the premaster secret using the client device's Diffie-Hellman public value and the Diffie-Hellman private value chosen by the key server.

Unlike traditional secure session implementations where the secure session server has local access to the private key during the handshake, in embodiments of the invention the private key is not locally accessible to the secure session server. This provides increased security during the secure session handshake. For example, although the secure session server may deliver web content on behalf of a website, the secure session server may not be at the physical premises of the website owner and/or be controlled by the website owner. This may cause the website owner to not trust the security of the secure session server and/or the operators of the secure session server. However, because the private key is stored remotely (not on the secure session server) and is instead stored on a key server in embodiments of the invention, the website owner does not lose control of the private key while still allowing for a secure session server that it does not control to provide secure session capability.

While embodiments described herein can be used for securing web traffic, the embodiments described herein can also be used to secure any network traffic that relies on key-based cryptography for security.

In one embodiment, the secure session server and the key server are owned by different entities. For example, the secure session server may be a proxy server in a cloud-based proxy service that provides one or more services for one or more domain owners. By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), image loading optimization (e.g., deferred image loading and/or auto-resizing), and/or other services. The key server may be owned or operated by a domain owner that is a customer of the cloud-based proxy service. By way of a specific example, the domain owner of example.com may be a customer of the cloud-based proxy service. The key server may be operated or under control of the domain owner, while the secure session server receives and transmits network traffic over a secure session between client devices and the secure session server for example.com, where the secure session was established using embodiments described herein where the private key is stored remotely from the secure session server. As a specific example, the key server may be an origin server of the website owner.

By way of a specific example, after establishing the secure session between a client device and the secure session server, the secure session server may receive an encrypted request for a resource (the resource may be hosted on the secure session server, the key server, or on a different server). The secure session server decrypts the encrypted request to determine the resource the client device is requesting. The secure session server then retrieves the requested resource. The resource may be retrieved locally by the secure sessions server (e.g., if the resource is locally available) or may be requested from an origin server that hosts the resource. In one embodiment, the secure session server may be a node in a CDN. In one embodiment, the secure session server and the key server are operated with different levels of security. For example, the key server may be operating in a high-security zone and the secure session zone may be operating in a lower-security zone.

Figure 10:
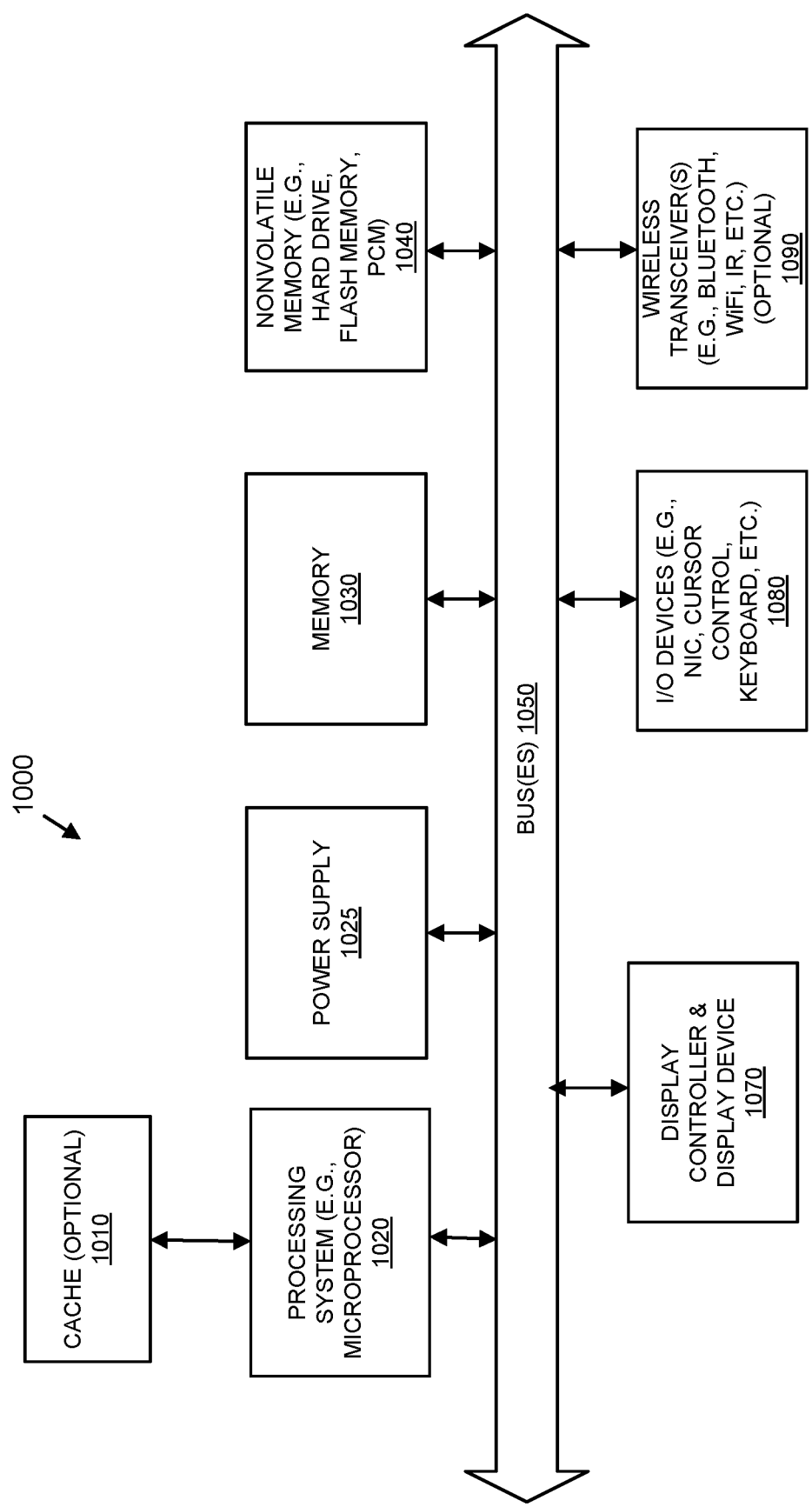
FIG. 10 is a block diagram illustrating an exemplary computing device that may be used in accordance with embodiments of the invention.

As illustrated in FIG. 10, the computing device 1000, which is a form of a data processing system, includes the bus(es) 1050 which is coupled with the processing system 1020, power supply 1025, memory 1030, and the nonvolatile memory 1040 (e.g., a hard drive, flash memory, Phase-Change Memory (PCM), etc.). The bus(es) 1050 may be connected to each other through various bridges, controllers, and/or adapters as is well known in the art. The processing system 1020 may retrieve instruction(s) from the memory 1030 and/or the nonvolatile memory 1040, and execute the instructions to perform operations described herein. The bus 1050 interconnects the above components together and also interconnects those components to the display controller & display device 1070, Input/Output devices 1080 (e.g., NIC (Network Interface Card), a cursor control (e.g., mouse, touchscreen, touchpad, etc.), a keyboard, etc.), and the wireless transceiver(s) 1090 (e.g., Bluetooth, WiFi, Infrared, etc.). One or more of the components of the computing device 1000 may be optional (e.g., the display controller and display device 1070, I/O devices 1080, the wireless transceiver(s) 1090, etc.). In one embodiment, the client devices 110, 410, and 710, the secure session servers 120, 420, and 720, and/or the key servers 130, 430, and/or 730 can take the form of the computing device 1000.

The techniques shown in the figures can be implemented using code and data stored and executed on one or more electronic devices (e.g., a client device, a proxy server, a key server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first server for establishing a secure session with a client device where a private key used for the secure session is stored in a second server, the method comprising:
    establishing an encrypted connection between the first server and the second server;
    receiving a set of one or more messages from the client device for establishing the secure session between the client device and the first server, wherein the set of one or more messages includes information for generation of a premaster secret;
    generating a set of cryptographic parameters;
    transmitting over the encrypted connection between the first server and the second server and as part of establishing the secure session between the client device and the first server, a request to the second server to use the private key, wherein the request includes the set of cryptographic parameters;
    receiving, from the second server over the encrypted connection, a response to the request to use the private key, the response including a signature using the private key over at least the set of cryptographic parameters;
    transmitting, to the client device, the set of cryptographic parameters and the signature;
    generating, at the first server, the premaster secret using at least part of the generated set of cryptographic parameters and the information for generation of the premaster secret included in the set of one or more messages received from the client device;
    generating a master secret using the generated premaster secret; and
        generating, using the generated master secret, a set of one or more session keys to be used in the secure session for encrypting and decrypting communication between the client device and the first server.

2. The method of claim 1, wherein the encrypted connection is a Virtual Private Network (VPN) connection.

3. The method of claim 1, wherein the encrypted connection is a different secure session between the first server and the second server.

4. The method of claim 1, wherein the first server and the second server are owned by different entities.

5. The method of claim 1, wherein the second server is configured to accept connections only over the encrypted connection from the first server.

6. An apparatus, comprising:
    a first server to include a set of one or more processors and a set of one or more non-transitory computer-readable storage mediums that is to store instructions, that when executed by the set of processors, cause the set of processors to perform operations for establishing a secure session with a client device where a private key used for the secure session is stored in a second server, the operations including:
        establish an encrypted connection between the first server and the second server;
        receive a set of one or more messages from the client device for establishing the secure session between the client device and the first server, wherein the set of one or more messages is to include information for generation of a premaster secret;
        generate a set of cryptographic parameters;
        transmit over the encrypted connection between the first server and the second server and as part of establishment of the secure session between the client device and the first server, a request to the second server to use the private key, wherein the request includes the set of cryptographic parameters;

receive, from the second server over the encrypted connection, a response to the request to use the private key, the response to include a signature using the private key over at least the set of cryptographic parameters;

transmit, to the client device, the set of cryptographic parameters and the signature;

generate, at the first server, the premaster secret using at least part of the generated set of cryptographic parameters and the information for generation of the premaster secret included in the set of one or more messages received from the client device;

generate a master secret using the generated premaster secret; and generate, using the generated master secret, of a set of one or more session keys to be used in the secure session for encrypting and decrypting communication between the client device and the first server.

7. The apparatus of claim 6, wherein the encrypted connection is a Virtual Private Network (VPN) connection.

8. The apparatus of claim 6, wherein the encrypted connection is a different secure session between the first server and the second server.

9. The apparatus of claim 6, wherein the first server and the second server are owned by different entities.

10. The apparatus of claim 6, wherein the second server is configured to accept connections only over the encrypted connection from the first server.

11. A non-transitory machine-readable storage medium that provides instructions that, when executed by a processor of a first server for establishing a secure session with a client device where a private key used for the secure session is stored in a second server, causes said processor to perform operations comprising:

establishing an encrypted connection between the first server and the second server;

receiving a set of one or more messages from the client device for establishing the secure session between the client device and the first server, wherein the set of one or more messages includes information for generation of a premaster secret;

generating a set of cryptographic parameters;

transmitting over the encrypted connection between the first server and the second server and as part of establishing the secure session between the client device and the first server, a request to the second server to use the private keys wherein the request includes the set of cryptographic parameters;

receiving, from the second server over the encrypted connection, a response to the request to use the private key the response including a signature using the private key over at least the set of cryptographic parameters;

transmitting, to the client device, the set of cryptographic parameters and the signature;

generating, at the first server, the premaster secret using at least part of the generated set of cryptographic parameters and the information for generation of the premaster secret included in the set of one or more messages received from the client device;

generating a master secret using the generated premaster secret; and generating, using the generated master secret, a set of one or more session keys to be used in the secure session for encrypting and decrypting communication between the client device and the first server.

12. The non-transitory machine-readable storage medium of claim 11, wherein the encrypted connection is a Virtual Private Network (VPN) connection.

13. The non-transitory machine-readable storage medium of claim 11, wherein the encrypted connection is a different secure session between the first server and the second server.

14. The non-transitory machine-readable storage medium of claim 11, wherein the first server and the second server are owned by different entities.

15. The non-transitory machine-readable storage medium of claim 11, wherein the second server is configured to accept connections only over the encrypted connection from the first server.

* * * * *